United States Patent [19]
Phillips et al.

[11] Patent Number: 5,367,884
[45] Date of Patent: Nov. 29, 1994

[54] GENERATOR-ABSORBER-HEAT EXCHANGE HEAT TRANSFER APPARATUS AND METHOD AND USE THEREOF IN A HEAT PUMP

[75] Inventors: Benjamin A. Phillips, Benton Harbor; Thomas S. Zawacki, St. Joseph, both of Mich.; Joseph Marsala, Glen Ellyn, Ill.

[73] Assignee: Phillips Engineering Co., St. Joseph, Mich.

[21] Appl. No.: 76,759

[22] Filed: Jun. 15, 1993

Related U.S. Application Data

[63] Continuation-in-part of Ser. No. 793,644, Nov. 18, 1991, Pat. No. 5,271,235, which is a continuation-in-part of Ser. No. 668,198, Mar. 12, 1991, abandoned.

[51] Int. Cl.$^5$ ............................... F25B 15/00
[52] U.S. Cl. ........................ 62/101; 62/476; 62/238.3; 62/497; 62/485
[58] Field of Search ............... 62/101, 112, 114, 105, 62/141, 148, 238.3, 476, 483, 485, 487, 495, 497

[56] References Cited

U.S. PATENT DOCUMENTS

| | | |
|---|---|---|
| 1,180,687 | 4/1916 | Altenkirch et al. |
| 1,854,223 | 4/1932 | Randel |
| 2,979,923 | 4/1961 | Bury |
| 3,046,756 | 7/1962 | Whitlow et al. |
| 3,055,194 | 9/1962 | Fink |
| 3,236,064 | 2/1966 | Whitlow |
| 3,254,507 | 6/1966 | Whitlow |
| 3,323,323 | 6/1967 | Phillips |
| 3,353,369 | 11/1967 | Whitlow |
| 3,357,203 | 12/1967 | Briggs |
| 3,357,688 | 12/1967 | Whitlow |
| 3,367,137 | 2/1968 | Whitlow |
| 3,367,310 | 2/1968 | Whitlow et al. |
| 3,390,544 | 7/1968 | Eberz |
| 3,394,926 | 7/1968 | Whitlow et al. |
| 3,407,625 | 10/1968 | McDonald |
| 3,410,104 | 11/1968 | Hopkins |
| 3,423,951 | 1/1969 | Eisberg |
| 3,466,893 | 9/1969 | Phillips et al. |
| 3,481,150 | 12/1969 | English |
| 3,483,710 | 12/1969 | Bearint |
| 3,491,551 | 1/1970 | Frohbieter |
| 3,491,552 | 1/1970 | Roeder, Jr. |
| 3,509,732 | 5/1970 | Roeder, Jr. |
| 3,517,522 | 6/1970 | Ozono et al. |
| 3,527,060 | 9/1970 | Kruggel |
| 3,527,061 | 9/1970 | Kruggel |
| 3,566,615 | 3/1971 | Roeder, Jr. |
| 3,584,975 | 6/1971 | Frohbieter |
| 3,626,716 | 12/1971 | Leonard, Jr. |
| 3,638,452 | 2/1972 | Kruggel |
| 3,639,087 | 2/1972 | Frohbieter |
| 3,641,784 | 2/1972 | Schlichtig |
| 3,690,121 | 9/1972 | Patel |
| 3,693,373 | 9/1972 | Gable |
| 3,717,007 | 2/1973 | Kuhlenschmidt |
| 3,750,416 | 8/1973 | Kuhlenschmidt |
| 3,895,499 | 7/1975 | Hopkins |
| 3,990,264 | 11/1976 | Patnode et al. |
| 4,031,712 | 6/1977 | Costello |
| 4,106,309 | 8/1978 | Phillips |
| 4,127,009 | 11/1978 | Phillips |
| 4,127,010 | 11/1978 | Phillips |
| 4,127,993 | 12/1978 | Phillips |
| 4,171,619 | 10/1979 | Clark |
| 4,193,268 | 3/1980 | Phillips |
| 4,207,751 | 6/1980 | Kampfenkel et al. |
| 4,209,364 | 6/1980 | Rothschild |
| 4,237,701 | 12/1980 | Holldorff |

(List continued on next page.)

OTHER PUBLICATIONS

Modahl et al., "Evaluation of a Commercial Advanced Absorption Heat Pump Breadboard", The Trane Company, La Crosse, Wis. 54601, pp. 117–125.

(List continued on next page.)

Primary Examiner—John M. Sollecito
Attorney, Agent, or Firm—Finnegan, Henderson, Farabow, Garrett & Dunner

[57] ABSTRACT

Numerous embodiments and related methods for generator-absorber heat exchange (GAX) are disclosed, particularly for absorption heat pump systems. Such embodiments and related methods use the working solution of the absorption system for the heat transfer medium.

89 Claims, 13 Drawing Sheets

U.S. PATENT DOCUMENTS

| | | |
|---|---|---|
| 4,246,761 | 1/1981 | Phillips et al. . |
| 4,285,211 | 8/1981 | Clark . |
| 4,299,093 | 11/1981 | Cohen et al. . |
| 4,311,019 | 1/1982 | Rojey et al. . |
| 4,329,851 | 5/1982 | Bourne . |
| 4,337,625 | 7/1982 | Wilkinson . |
| 4,383,416 | 5/1983 | Phillips . |
| 4,410,134 | 10/1983 | Heimbach et al. . |
| 4,445,340 | 5/1984 | Reimann . |
| 4,454,724 | 6/1984 | Erickson . |
| 4,463,570 | 8/1984 | Kantner . |
| 4,467,623 | 8/1984 | Reimann . |
| 4,475,361 | 10/1984 | Alefeld . |
| 4,476,694 | 10/1984 | Kunugi . |
| 4,485,638 | 12/1984 | Reimann . |
| 4,505,133 | 3/1985 | Malewski et al. . |
| 4,526,009 | 7/1985 | van der Sluys et al. . |
| 4,531,374 | 7/1985 | Alefeld . |
| 4,534,180 | 8/1985 | Yasuda et al. . |
| 4,542,628 | 9/1985 | Sarkisian et al. . |
| 4,542,629 | 9/1985 | Biermann . |
| 4,545,217 | 10/1985 | Nakao et al. . |
| 4,546,620 | 10/1985 | Biermann . |
| 4,563,295 | 1/1986 | Erickson . |
| 4,567,736 | 2/1986 | van der Sluys et al. . |
| 4,580,407 | 4/1986 | Aime et al. . |
| 4,593,531 | 6/1986 | Fujimoto . |
| 4,596,122 | 6/1986 | Kantner . |
| 4,646,541 | 3/1987 | Reid, Jr. et al. . |
| 4,665,711 | 5/1987 | Page . |
| 4,691,525 | 9/1987 | Gelderloos . |
| 4,691,532 | 9/1987 | Reid et al. . |
| 4,706,464 | 11/1987 | Kreutmair . |
| 4,718,243 | 1/1988 | Buschulte et al. . |
| 4,719,767 | 1/1988 | Reid, Jr. et al. . |
| 4,722,193 | 2/1988 | Purvis et al. . |
| 4,724,679 | 2/1988 | Radermacher . |
| 4,732,008 | 3/1988 | DeVault . |
| 4,735,065 | 4/1988 | Vinz . |
| 4,742,687 | 5/1988 | Reid et al. . |
| 4,742,693 | 5/1988 | Reid, Jr. et al. . |
| 4,763,488 | 8/1988 | Johnston . |
| 4,770,005 | 9/1988 | Alefeld . |
| 4,827,728 | 5/1989 | DeVault et al. . |
| 4,846,240 | 7/1989 | Erickson . |
| 4,894,998 | 1/1990 | Kaneko et al. . |
| 4,921,515 | 5/1990 | Dao . |
| 4,926,659 | 5/1990 | Christensen et al. . |
| 4,938,028 | 7/1990 | Murray . |
| 4,966,007 | 10/1990 | Osborne . |
| 4,966,014 | 10/1990 | Erickson . |
| 4,967,566 | 11/1990 | Bergmann et al. . |
| 5,016,444 | 5/1991 | Erickson . |
| 5,024,063 | 6/1991 | Erickson . |
| 5,033,274 | 7/1991 | Erickson . |
| 5,038,574 | 8/1991 | Osborne . |
| 5,050,392 | 9/1991 | Messmer et al. . |
| 5,050,403 | 9/1991 | Maier-Laxhuber . |
| 5,058,394 | 11/1991 | Wilkinson ............... 62/476 |
| 5,097,676 | 3/1992 | Erickson . |
| 5,157,942 | 10/1992 | Dao .................. 62/476 |

OTHER PUBLICATIONS

International Journal of Refrigeration, vol. 9, No. 6, Nov. 1986, pp. 326–333, Scharfe et al., "Analysis of Advantages and Limitations of Absorber–Generator Heat Exchange".

B. A. Phillips; "Analyses of Advanced Residential Absorption Heat Pump Cycles"; Proceedings of DOE/ORNL Heat Pump Conference, Washington, D.C.; Dec. 11–13, 1984; pp. 265–287.

B. A. Phillips; "High Efficiency Absorption Cycles for Residential Heating and Cooling"; Intersociety Energy Conversion Eng. Conference, Miami Beach, Fla.; Aug. 18–23, 1985; pp. 2.229–2.234.

B. A. Phillips; "A New Future for Absorption?"; ASHRAE Journal; Nov. 1986; pp. 38–42.

B. A. Phillips; "Progress and Problems in Recent Research on Absorption Cycles and Fluids"; U.S.–Israel Workshop, Washington, D.C.; Apr. 23–24, 1987; pp. 89–93.

B. A. Phillips; "Development of an Advanced–Cycle Absorption Heat Pump for Residential Applications"; Proceedings of the 2nd DOE/ORNL Heat Pump Conference, Washington, D.C., Apr. 17–20, 1988, pp. 111–116; Document prepared by ORNL for DOE, published Aug. 1988.

B. A. Phillips; "High Efficiency Absorption Cycles for Residential Heating and Cooling"; pp. 1–6.

B. A. Phillips; "Development of a Gas Fired Heat Pump with an Improved Absorption Cycle"; ASME Winter Annual Meeting, Nov. 27–Dec. 2, 1988; Chicago, Ill.

Columbia Double–Effect Absorption Gas Heat Pump, Market and Technology Prospective; Columbia Gas System Services Corp., Columbus, Ohio, Feb., 1990.

B. A. Phillips; "Development of a High Efficiency, Gas–Fired, Absorption Heat Pump for Residential and Small–Commercial Applications–Phase I Final Report Analysis of Advanced Cycles and Selection of the Preferred Cycle"; Oak Ridge National Laboratory, Sep., 1990.

Dr. Benjamin A. Phillips; "Absorption Cycles for Air–Cooled Solar Air Conditioning", St. Joseph, Mich., 1976.

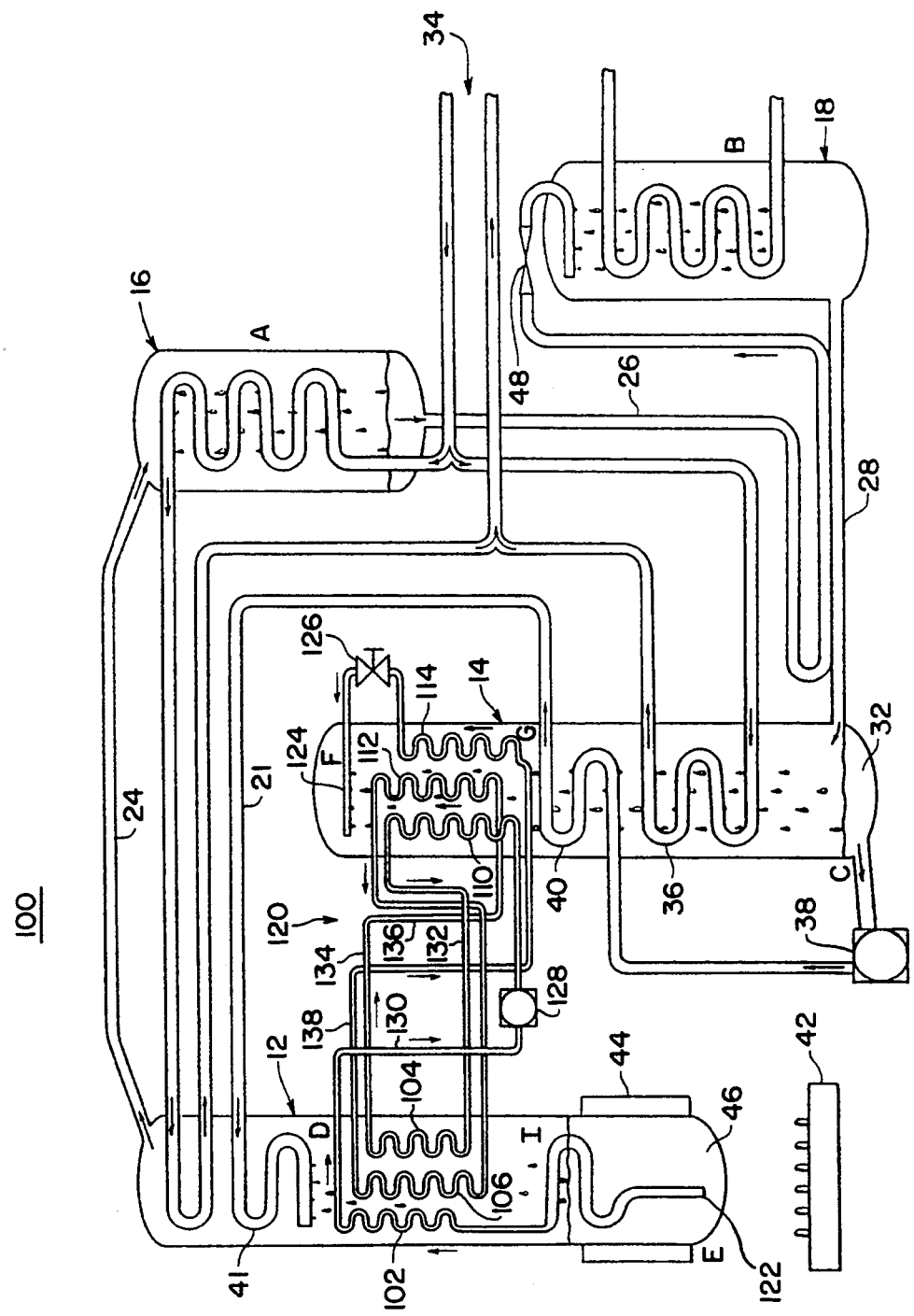

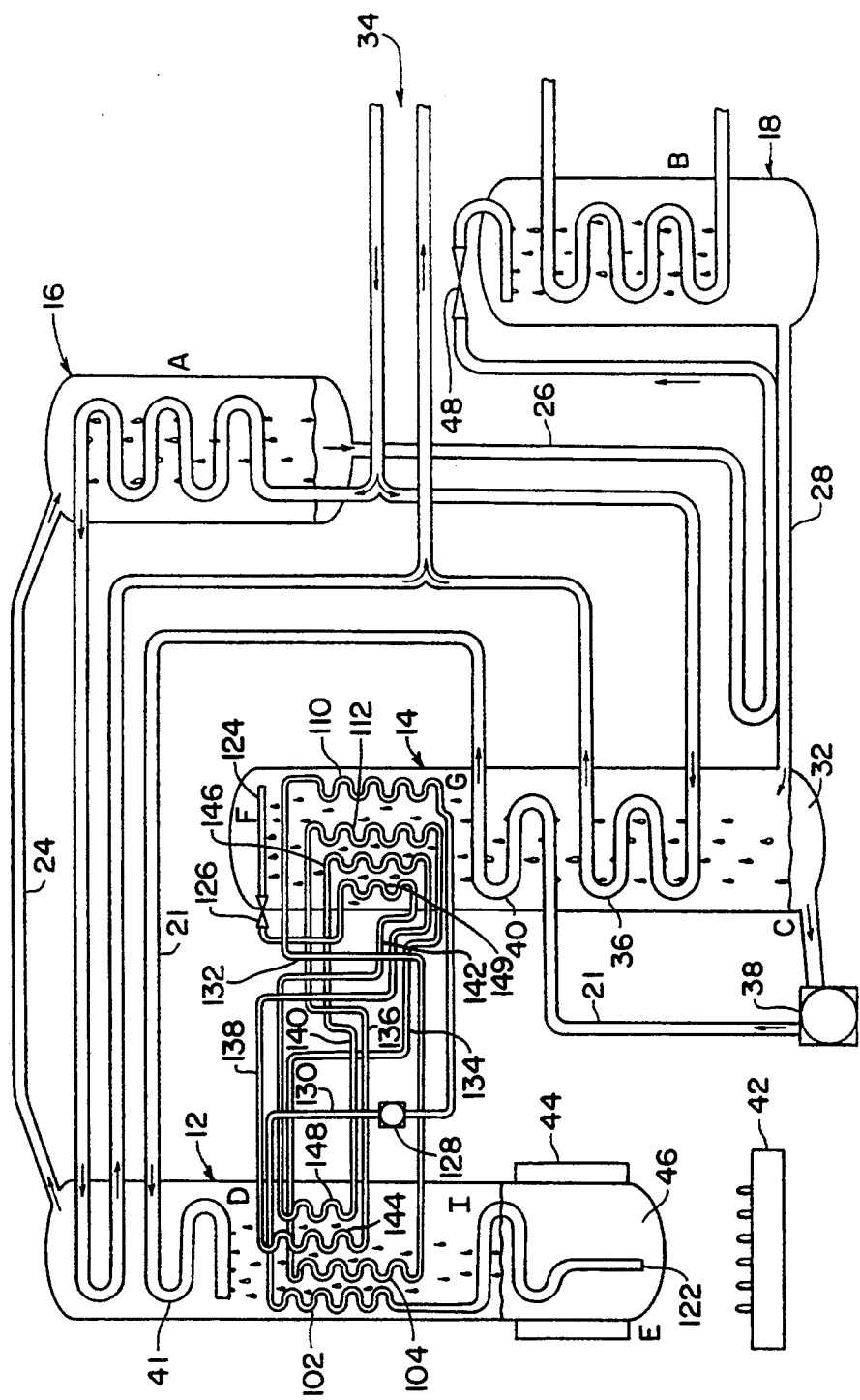

200

370

430

450

550

GENERATOR-ABSORBER-HEAT EXCHANGE HEAT TRANSFER APPARATUS AND METHOD AND USE THEREOF IN A HEAT PUMP

GOVERNMENT RIGHTS

This invention was made with Government support under contract 86X-17497C awarded by the Department of Energy. The Government has certain rights in this invention.

RELATED APPLICATIONS

The present invention is a continuation-in-part of application Ser. No. 07/793,644, filed on Nov. 18, 1991 now U.S. Pat. No. 5,271,235, which is a continuation in part of application Ser. No. 07/668,198, filed Mar. 12, 1991, now abandoned.

BACKGROUND OF THE INVENTION

1. Field of the Invention

The present invention relates to refrigeration and heat pump systems and more particularly to an absorption refrigeration cycle of the generator-absorber-heat exchange ("GAX") type. The invention is especially adapted for use in a gas-fired, air-to-air, absorption heat pump.

2. Description of Related Art

Absorption refrigeration cycles were developed in the mid 1800's and were used primarily in refrigeration systems. Such cycles operated by using a refrigerant-/absorbent mixture, the refrigerant vapor being absorbed in an absorber into a liquid absorbent, thus producing heat, followed by heating the refrigerant/absorbent mixture in a generator to drive off the refrigerant vapor. A condenser, which also produced heat, and an evaporator, which extracted heat, completed the cycle. The heat produced by absorption in the absorber was discarded, along with that from the condenser, to a coolant, generally cooling water.

These early "single stage" absorption cycle systems were energy inefficient but were often preferred to compression systems, before the advent of electric motors, because the cost of heat energy to operate them was low and they required much less mechanical energy than compression systems. For most applications, the use of these single stage absorption systems declined with changes in the relative cost of gas and electric energy and improvements in electrically operated compression systems. However, even today, these relatively inefficient single stage systems are still in use in low pressure lithium bromide commercial air conditioning systems and in refrigeration systems for recreational vehicles and hotel rooms.

In 1913, an improved absorption cycle was devised by Altenkirch. This cycle was made more efficient than the early single stage cycles by transferring a portion of the heat produced in the absorber to the refrigerant/absorbent fluid circulated to the generator. This transfer of heat reduced the total heat input required to the generator to evaporate the refrigerant from the refrigerant/absorbent mixture. This system has been called the absorber heat exchange (AHE) system.

The AHE cycle was used in the early 1960's to produce absorption systems that were efficient enough to be cost effective air conditioners at that time. The AHE cycle has been used in residential, air cooled air conditioners, starting in 1965. However, even in these AHE systems, a large portion of the heat generated by the absorption process in the absorber was lost. The AHE cycle was also used expermentally in air-to-air gas heat pumps, which were advantageous in heating, but were never commercially produced. As energy costs have increased, the AHE air conditioners have lost much of their operating cost advantages and today, have only a limited market.

Also in 1913, Altenkirch devised another absorption cycle that recovered more of the heat of absorption from the absorber. This cycle, which has come to be known as the generator-absorber heat exchange (GAX) cycle, utilized an additional heat exchange system, whereby high temperature heat produced by the absorption process in the absorber was transferred via a heat exchange fluid to the generator. This GAX cycle concept is capable of recovering an additional large amount of heat from the absorber and capable of utilizing higher generator temperatures than the AHE system and thus is capable of achieving much higher energy efficiencies. The heating efficiency of such GAX systems, relative to the particular fuel used, can be much higher than that of furnaces, boilers, etc.

However, prior art GAX cycle systems suffered from the disadvantage that a separate heat transfer circuit using a separate heat transfer fluid was required. This heat transfer circuit had to be hermetic, required an expansion chamber, required a pump capable of variable flow, and required a control system that matched the amount of flow of the heat transfer fluid to the GAX heat to be transferred in either the cooling or heating cycle at the particular outdoor temperature. These prior art GAX systems typically used a heat transfer fluid that remained in the liquid phase and thus could only use the sensible heat of the heat transfer liquid.

Electric heat pumps, which operate with a standard condenser-evaporator cycle, have heretofore been utilized for residential and small commercial heating and cooling applications. However, while electric heat pumps can effectively satisfy the heating and cooling requirements of residential and small commercial buildings in areas having relatively mild climates, such as the southern states of the United States, these electric heat pumps are not capable of providing, without auxiliary heating equipment, the necessary heating in climates where the temperatures drop below about 30° F. In addition, these electric heat pump systems typically use refrigerants that may be hydrochlorofluorocarbons (HCFC's) of chlorofluorocarbons (CFC's), which are environmentally hazardous.

Thus, the need exists for a generator-absorber heat exchange apparatus and method suitable for use in a residential or small commercial heat pump that efficiently transfers a large portion of heat produced by the absorption process in the absorber to the generator without the use of a costly, possibly failure prone, independent heat transfer circuit.

The instant invention satisfies that need by providing a generator-absorber heat exchange apparatus and method that can use an environmentally safe fluid both as the working fluid and the heat exchange fluid, that efficiently recovers a large proportion of the heat generated by the absorption process in the absorber, that does not require an elaborate system of controls, that advantageously may use both the latent heat and the sensible heat of the working fluid to transfer heat from the absorber to the generator by operating between its vapor and liquid phases, and that, because of size, cost and efficiency, can be used to satisfy residential or small commercial heating and cooling requirements over a wide range of climates, including sufficient heating at temperatures below 0° F.

Additional features and advantages of the invention will be set forth in the drawings and written description which follow, and in part will be apparent from the drawings and written description or may be learned from the practice of the invention. The advantages of the invention will be realized and attained by the generator-absorber heat exchange apparatus, the heat pump incorporating the generator-absorber heat exchange apparatus and the method for transferring heat between an absorber and generator in a generator-absorber heat exchange apparatus, particularly pointed out in the drawings, written description and claims hereof.

SUMMARY OF THE INVENTION

To achieve these and other advantages, and in accordance with the purpose of the invention as embodied and broadly described herein, the present invention, in one aspect, provides a generator-absorber heat exchange apparatus that includes a generator and an absorber. The absorber has an interior pressure lower than the interior pressure of the generator and each has high and low temperature regions at opposite ends and a heat transfer region. The temperature ranges of the generator and absorber that define the respective heat transfer regions overlap. A fluid flow pathway is provided for circulation of a weak liquor from the high temperature region of the generator and a rich liquor from a low temperature region of the absorber to and through the high temperature, heat transfer and low temperature regions of the generator and the absorber. The improvement to the generator-absorber heat exchange apparatus in accordance with the invention, as embodied and broadly described herein, comprises a heat exchange circuit disposed to receive at least a portion of the liquor from the fluid flow pathway and to circulate the portion of the liquor between the heat transfer regions of the absorber and the generator to transfer heat from the absorber to the generator.

In a preferred embodiment, the heat exchange circuit further comprises a heat exchange element disposed in the heat transfer region of one of the generator and absorber and a conduit conducting the portion of the liquor from the fluid flow pathway to the heat exchange element and to the other of the generator and absorber.

In a further preferred embodiment, the heat exchange circuit further comprises a plurality of heat exchange elements, at least one being disposed in the heat transfer region of each of the generator and absorber, and a conduit conducting the portion of the liquor from the fluid flow pathway serially to each heat exchange element alternately between heat transfer regions.

In accordance with another aspect of the invention, the heat exchange circuit preferably includes an input end in fluid communication with the fluid flow pathway and an output end for disseminating the portion of liquor circulated between heat transfer regions within either the generator or absorber. The input end may be in fluid communication with the fluid flow pathway at a location where the liquor is a rich liquor liquid, a weak liquor liquid, or a weak liquor vapor. The liquor circulated between heat transfer regions of the generator and absorber may be substantially in the liquid state or may be a two phase mixture of liquid and vapor.

The present invention, in another aspect, comprises a generator-absorber heat exchange apparatus that includes a generator adapted to contain a liquor having a concentration gradient extending from rich proximate an upper end to weak proximate a lower end and a temperature gradient extending from low proximate the upper end to high proximate the lower end. The generator-absorber heat exchange (GAX) apparatus in this aspect of the invention also includes an absorber having a pressure in its interior lower than the interior pressure of the generator and adapted to contain a liquor having a concentration gradient extending from weak proximate an upper end to rich proximate a lower end and a temperature gradient extending from high proximate the upper end to low proximate the lower end. The GAX apparatus in this aspect also includes a rich liquor conduit having an inlet in fluid communication with the absorber proximate the lower end thereof and an outlet disposed in the generator proximate the upper end thereof to distribute rich liquor from the lower end of the absorber for passage along the concentration and temperature gradients of the generator. A pump in fluid communication with the rich liquor conduit is also provided for moving fluid through the conduit from the absorber to the generator. A weak liquor conduit having an inlet in fluid communication with the generator proximate the lower end thereof and an outlet disposed in the absorber proximate the upper end thereof is provided to distribute weak liquor from the lower end of the generator for passage along the concentration and temperature gradients of the generator. A heater is disposed to heat liquor in the generator proximate the lower end thereof. The GAX apparatus in this aspect of the invention also includes a heat exchange circuit comprising:

at least one heat exchanger disposed in one of the absorber and generator in a heat transfer region thereof; and a heat exchange conduit having an input end disposed to receive liquor from at least one of the absorber, the generator, the rich liquor conduit and the weak liquor conduit, and an output end disposed to distribute the liquor in one of the absorber and generator, the conduit conveying the liquor between the heat transfer regions of the absorber and the generator for heat transfer therein.

Several GAX heat transfer apparatuses described herein also serve as either the weak liquor or rich liquor pathway, thereby eliminating the need for an additional separate weak liquor or rich liquor pathway. By eliminating the need for a separate, independent GAX heat transfer circuit, the present invention, when incorporated in an absorption system, results in reduced material, labor and assembly costs, and furthermore reduces overall maintenance and service requirements of the system. In addition, incorporation of the present invention in an absorption system results in increased reliability of the overall system, as a separate point of potential system failure is eliminated as compared to previous absorption systems which used a separate, independent GAX heat transfer circuit.

The present invention also provides, in another aspect, a heat pump comprising an indoor liquid-air heat exchanger, an outdoor liquid-air heat exchanger, the generator-absorber heat exchange apparatus and an antifreeze circuit. The antifreeze circuit in accordance with this aspect of the invention is disposed to circulate antifreeze fluid between the indoor and outdoor heat exchangers and the generator-absorber heat exchange apparatus for selectively extracting heat from one of the heat exchangers and transferring heat to the other of the heat exchangers.

In accordance with another aspect of the present invention, a method is provided for transferring heat between an absorber and a generator in a generator-absorber heat exchange apparatus. This heat transfer is accomplished by circulating a portion of at least one of a rich liquor and a weak liquor between a heat transfer region of the absorber and a heat transfer region of the generator. As mentioned above, the heat transfer region of the generator and the heat transfer region of the absorber have temperature gradients including a common temperature range.

In accordance with another aspect of the invention, a method is provided for transferring heat between a region of low temperature and a region of medium temperature using the generator-absorber heat exchange apparatus of the invention. This method comprises circulating at least a portion of antifreeze fluid between an indoor heat exchanger and at least one of an absorber heat exchanger, a condenser heat exchanger and a generator heat exchanger, thereby transferring heat via the antifreeze fluid from the at least one absorber, condenser and generator heat exchanger to the indoor-heat exchanger. The method also comprises circulating an antifreeze fluid between an outdoor heat exchanger and an evaporator heat exchanger, thereby transferring heat via the antifreeze fluid from the outdoor heat exchanger to the evaporator heat exchanger.

In accordance with another aspect of the invention, a method is provided for transferring heat between a region of high temperature and a region of medium temperature using the generator-absorber heat exchange apparatus of the invention. This method comprises circulating at least a portion of antifreeze fluid between an outdoor heat exchanger and at least one of an absorber heat exchanger, a condenser heat exchanger and a generator heat exchanger, thereby transferring heat via the antifreeze fluid from the at least one absorber, condenser and generator heat exchanger to the outdoor heat exchanger. The method also comprises circulating an antifreeze fluid between an indoor heat exchanger and an evaporator heat exchanger, thereby transferring heat via the antifreeze fluid from the indoor heat exchanger to the evaporator heat exchanger.

Although the invention is illustrated as embodied in a gas-fired residential heat pump, the invention as broadly claimed is not so limited and its benefits and advantages apply equally to other heating and refrigeration processes. The above and other advantages and features of this invention will become apparent upon review of the following specification in conjunction with the drawings.

BRIEF DESCRIPTION OF THE DRAWINGS

FIG. 3 is a flow diagram of a first embodiment of the GAX apparatus of the present invention;

FIG. 3A is a flow diagram of a variation of the first embodiment of the GAX apparatus of the present invention;

DETAILED DESCRIPTION OF THE PREFERRED EMBODIMENTS

In accordance with the invention, the term "weak liquor" as used herein refers to the liquor in the high temperature region, i.e., the bottom portion, of the generator. The term "rich liquor" as used herein refers to the liquor in the low temperature region, i.e., the bottom portion, of the absorber. The terms "weak" and "rich" refer to the relative concentration of the absorbed component(s), i.e., refrigerant, to the concentration of the absorbent component(s), i.e., water. Thus, a weak liquor liquid has less absorbed refrigerant, such as ammonia, and more absorbent, such as water, than an equal amount of a rich liquor liquid. However, a vapor in equilibrium with a liquid will have a much higher concentration of refrigerant than the liquid. For example, at the bottom of the absorber, the vapor entering from the evaporator may have a concentration of refrigerant of, for instance, about 99%, while the rich liquor liquid in equilibrium with this rich liquor vapor may have a concentration of refrigerant of, for example, about 40%. Accordingly, the weak liquor vapor at the top of the absorber that is in equilibrium with the weak liquor liquid entering from the generator will have a concentration of refrigerant that is greater than the weak liquor liquid concentration.

As noted above, both the absorbed component(s) and the absorbent component(s) constituting the weak liquor and rich liquor may be in either a vapor or liquid state or a combination of the two. Also, the term "heat pump" as used herein is intended to include any apparatus that transforms heat between low, medium and high temperature states and is intended to include not only the commonly understood meaning of the term, but also as used herein is intended to include heat transformers as well as more traditional systems such as refrigeration and related processes.

Figure 1:
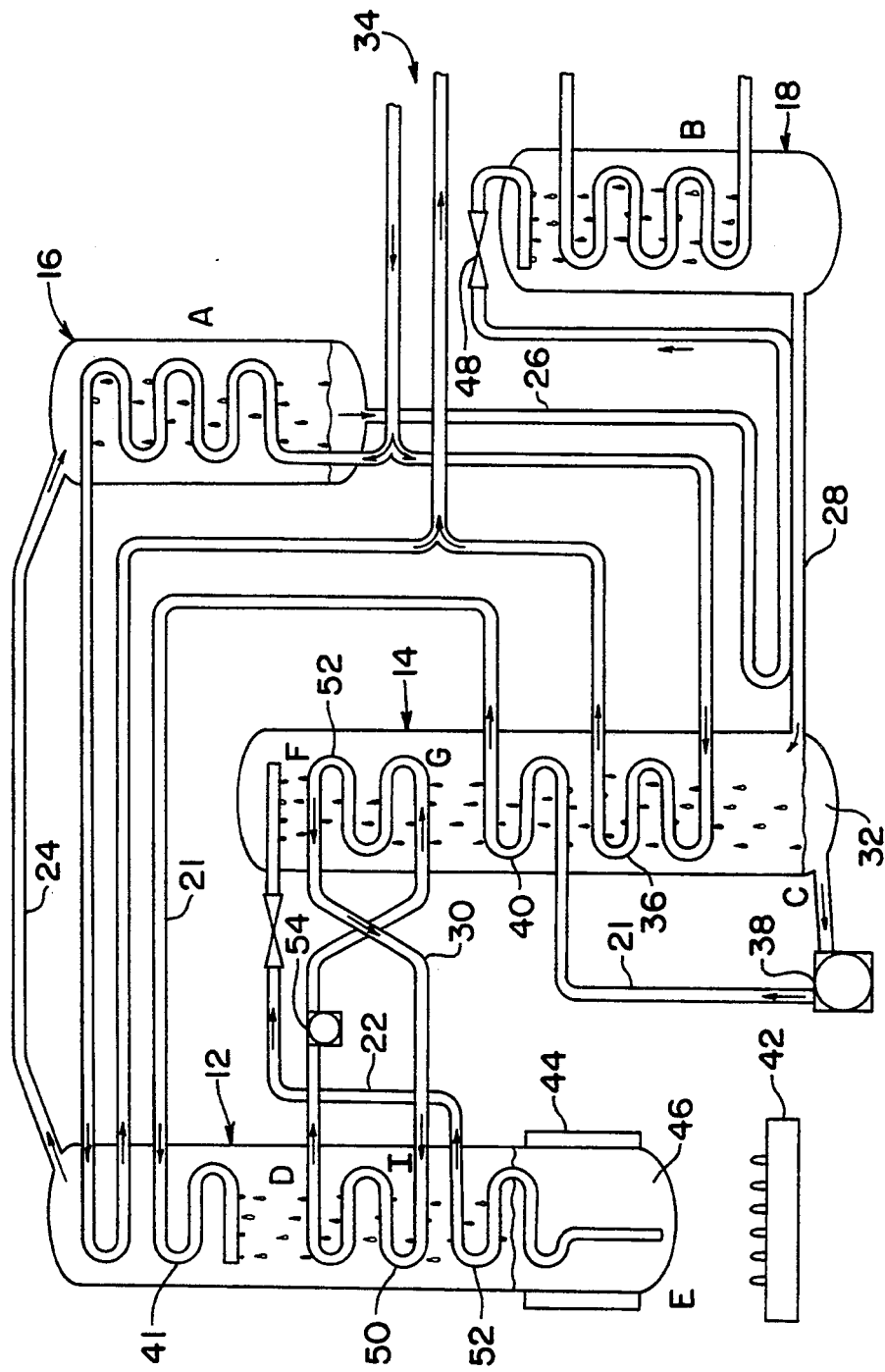
FIG. 1 is a flow diagram illustrating an absorption apparatus using a conventional generator-absorber, heat-exchange (GAX) circuit.

In the known prior art system illustrated in FIG. 1, a generator-absorber heat exchange apparatus 10 operating on the generator-absorber heat exchange (GAX) cycle generally comprises a generator 12, an absorber 14, a condenser 16, an evaporator 18 and a refrigerant liquor pathway for circulation of a refrigerant liquor to and through generator 12 and absorber 14. In particular, the refrigerant liquor pathway includes a rich liquor pathway 21 providing fluid communication of rich liquor 32 from a low temperature region C of absorber 14 to a low temperature region D of generator 12, and a weak liquor pathway 22 providing fluid communication of weak liquor 46 from a high temperature region E of generator 12 to a high temperature region F of absorber 14. The refrigerant liquor pathway is completed by passage of liquor from weak liquor pathway 22 through high temperature, intermediate temperature and low temperature regions F, G, C of absorber 14 and by passage of liquor from rich liquor pathway 21 through low temperature, intermediate temperature and high temperature regions D, I, E of generator 12. The refrigerant pathway is completed from generator 12 to condenser 16 through conduit 24, from condenser 16 to evaporator 18 through conduit 26, and from evaporator 18 to absorber 14 through conduit 28.

The terms "low temperature region," "intermediate temperature region" and "high temperature region" as used herein are meant to refer to relative temperatures. As depicted in FIG. 1, each region will be defined by a range of temperatures which in each particular component is relatively higher or lower than the other region. Thus, for example, high temperature region E of generator 12 might have a temperature of around 400° F. and low temperature region D of generator 12 might have a temperature of around 200° F. On the other hand, high temperature region F of absorber 14 might have a temperature of around 300° F. and low temperature region C of absorber 14 might have a temperature of around 100° F. In each of generator 12 and absorber 14 there is an area of overlapping temperature termed herein the heat transfer region. This heat transfer region is depicted in FIG. 1 as the area between regions D and I of generator 12 and the area between regions G and F of absorber 14.

An absorption generator is, in essence, a distillation column, which has a stripping section and a rectifying section. The stripping section is the lower, hotter section corresponding to the portion between regions D and E, while the rectifier section is the upper, cooler section corresponding to the portion above region D. The dividing point between the stripping and rectifying sections, region D, is the region of the generator that has a temperature corresponding to the boiling point of the rich liquor liquid at the generator pressure.

As depicted in FIG. 1, the vertical temperature gradients of absorber 14 and generator 12 are reversed, i.e., the highest temperature region E of generator 12 is at or near its lower or bottom end, whereas the highest temperature region F of absorber 14 is at or near its upper end. Thus, the orientation of the respective heat transfer regions D-I and G-F is similarly opposite. The temperature range defining heat transfer regions D-I and G-F is within the temperature overlap between the temperature range of generator 12 and the temperature range of absorber 14, e.g., within the range of, for example, about 200° F. to about 300° F.

The known apparatus depicted in FIG. 1 includes a heat transfer circuit 30 disposed between heat transfer regions D-I and G-F of generator 12 and absorber 14, which is oriented so as to conduct fluid directly between areas of the heat transfer regions.

During operation of the known system of FIG. 1, a low pressure refrigerant, consisting primarily of a refrigerant, such as ammonia, but possibly containing a small amount of absorbent if it is volatile, such as water, exits evaporator 18 mostly as a vapor and passes through conduit 28 to absorber 14 at low temperature region C. This refrigerant vapor rising upward through absorber 14 is absorbed into a countercurrent flow of weak liquor, thus producing a rich liquor 32 that accumulates in the liquid state at low temperature region C of absorber 14. This process takes place at a temperature above that of the surroundings, generating heat, some of which is transferred to air, water, antifreeze or other heat transfer fluid circulating during this process through heat exchanger 36 located in a heat exchange circuit 34.

Rich liquor 32 is then transferred along rich liquor pathway 21 by a solution pump 38 to region D of generator 12, where a higher pressure is maintained. A higher pressure is maintained in generator 12 than in absorber 14. For example, the pressure in generator 12 may commonly be around 240–400 psia and the pressure in absorber 14 may be around 15–80 psia. In accordance with the absorber heat exchange (AHE) cycle principle, heat exchanger 40 in rich liquor pathway 21 is used to transfer absorber heat to rich liquor 32. In one alternative, rich liquor 32 is heated in heat exchanger 40 to its boiling point at the pressure of generator 12 and provided as a heat input to region D of generator 12. Alternatively, as shown in FIG. 1, rich liquor 32 is heated in heat exchanger 40 to a temperature below its boiling point and thereafter is heated in heat exchanger 41 in the rectifier section above region D of generator 12. In either alternative, rich liquor 32 is distributed within generator 12 at region D.

Heat source 42 and heat transfer fins 44 cooperate to heat rich liquor 32 as it passes downward through generator 12, thereby driving refrigerant vapor from rich liquor 32 to form weak liquor 46 at high temperature region E of generator 12. Vapor having a concentration of near 100% refrigerant is expelled from generator 12 through refrigerant pathway 24 to condenser 16 where it is condensed and fed via conduit 26 through restriction means 48 to a lower pressure in evaporator 18. Weak liquor 46 in high temperature region E of generator 22 is returned through weak liquor pathway 22 to high temperature region F of absorber 14. The sensible heat of weak liquor 46 is provided as a heat input to generator 12 at heat exchanger 52. Heat may also be transferred in a heat exchanger (not shown) between rich liquor pathway 21 and weak liquor pathway 22.

In the known generator-absorber heat exchange system illustrated in FIG. 1, heat transfer is performed by a GAX heat transfer circuit 30, including, for example, a pair of heat exchange coils 50 and 52 and a pump 54 to circulate heat transfer fluid such as pressurized water. Since the vertical temperature gradients of absorber 14 and generator 12 are reversed, it is necessary to cross-connect the pathways between coils 50 and 52, as illustrated in FIG. 1.

Figure 2:
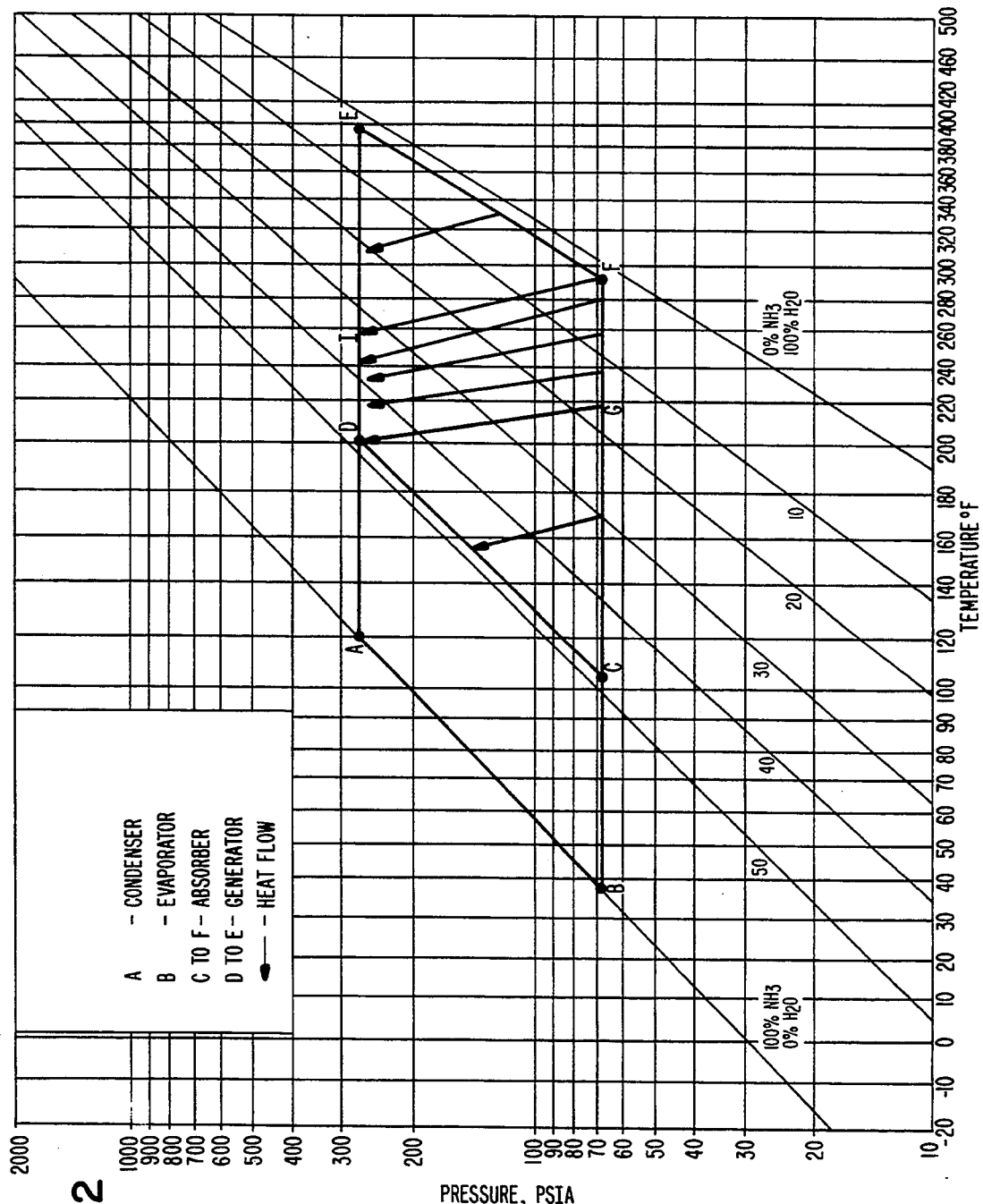
FIG. 2 is a pressure-temperature-composition diagram (P-T-X) of the system in FIG. 1.

The principle of the GAX cycle is illustrated in the pressure-temperature-composition diagram of FIG. 2 in which point D represents the dividing point between the stripping and rectifying sections of generator 12, point E represents the high temperature region of generator 12, point C represents the low temperature region of absorber 14, point F represents the high temperature region of absorber 14, point I represents the region of generator 12 that is at a temperature lower than the temperature of point F in absorber 14 by an amount sufficient to provide the necessary temperature difference for heat transfer between those regions, and point G represents the region of absorber 14 that is at a temperature higher than the temperature of point D in generator 12 by an amount sufficient to provide the necessary temperature difference for heat transfer between those regions. These regions in FIG. 2 correspond to regions D, E, C, F, I and G, respectively, in FIG. 1. Line D-I represents the heat transfer region of generator 12 and line G-F represents the heat transfer region of absorber 14. Points A and B represent the condenser 16 and evaporator 18, respectively. The line from C to D represents rich liquor pathway 21 and the line from E to F represents weak liquor pathway 22. The arrows in FIG. 2 extending from the G-F line to the D-I line indicate heat transfer from the heat transfer region of absorber 14 to the heat transfer region of generator 12.

The heat to be transferred from absorber 14 to generator 12 is available over a temperature range in absorber 14 and should be transferred to a temperature range in generator 12 that is cooler only by the temperature differential required to transfer the heat. To do this most efficiently, the heat from the hottest segment of heat transfer region F of absorber 14 should be transferred to the hottest segment of heat transfer region I in generator 12, and similarly for each of the progressively cooler segments of heat transfer regions of absorber 14 and generator 12. This means that the heat transfer fluid temperature range must fit between the heat transfer region temperature ranges of generator 12 and absorber 14, and each of the segments.

In accordance with the present invention, as embodied and broadly described herein, a heat exchange circuit is provided in a generator-absorber heat exchange apparatus that includes a generator and an absorber. The absorber has an interior pressure lower than the pressure of the generator interior and each of the generator and absorber has vertically opposed high and low temperature regions and a heat transfer region. The temperature ranges defining the respective heat transfer regions overlap. The generator-absorber heat exchange apparatus includes a fluid flow pathway for circulation of a liquor having rich and weak concentrations of refrigerant to and through the high temperature, heat transfer and low temperature regions of the generator and absorber.

The present invention provides various embodiments and methods for performing GAX heat transfer in a generator-absorber heat exchange apparatus using the refrigerant/absorbent working fluid of the system. The apparatus of the invention includes a heat exchange circuit that is disposed to receive at least a portion of the liquor from the fluid flow pathway and to circulate the liquor between the heat transfer regions of the absorber and the generator to transfer heat from the absorber to the generator. The term "heat transfer region" as used herein is intended to include not only regions in the interior of the generator and absorber having overlapping temperatures, but also those regions adjacent to or in heat transfer contact with the interior of the generator and absorber having overlapping temperatures. The transfer should preferably be provided over the full overlap temperature range.

In accordance with the invention, as embodied and broadly described herein, the heat exchange circuit comprises a heat exchange element disposed in the heat transfer region of one of the generator and the absorber and a conduit conducting a portion of the liquor from the fluid flow pathway to the heat exchange element and then to the heat transfer region of the other of the generator and absorber. The heat exchange circuit of the invention may include a plurality of heat exchange elements, at least one being disposed in the heat transfer region of each of the generator and absorber with a conduit conducting the liquor from the fluid flow pathway serially to each heat exchange element alternately between heat transfer regions. There may be anywhere from one to up to four or more heat exchange elements in each of the generator and absorber depending upon the particular embodiment of the invention. The term "heat exchange element" as used in accordance with the invention refers to any apparatus or device that is capable of providing for the exchange of heat between fluids, such as a heat exchange coil.

In accordance with the invention, as embodied and broadly described herein, the motive force for circulating the liquor in the heat exchange circuit may alternatively be provided by a pump, the pressure differential between the generator and absorber or an ejector, or combinations thereof. The heat exchange circuit also preferably includes an input end in fluid communication with the fluid flow pathway for withdrawing refrigerant liquor from the refrigerant liquor pathway and an output end for distributing the liquor within either the generator or absorber.

Figure 4:
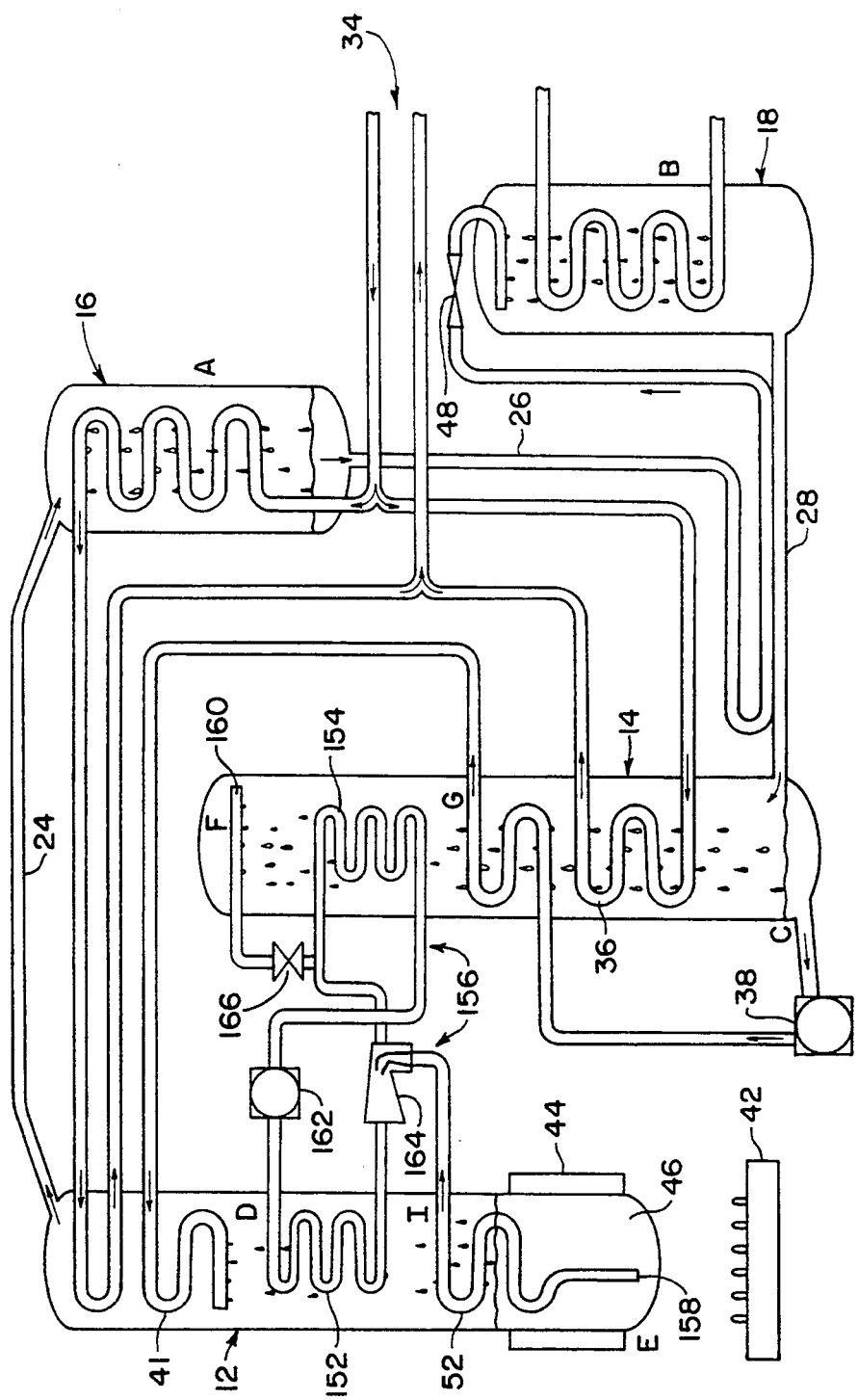
FIG. 4 is a flow diagram of a second embodiment of the GAX apparatus of the present invention.

Two embodiments of the invention, as illustrated in FIGS. 3 and 4, provide an input end in fluid communication with the fluid flow pathway at a location where the liquor is a weak liquor liquid, thus using the weak liquor as the heat transfer medium for the heat exchange circuit.

Figure 6:
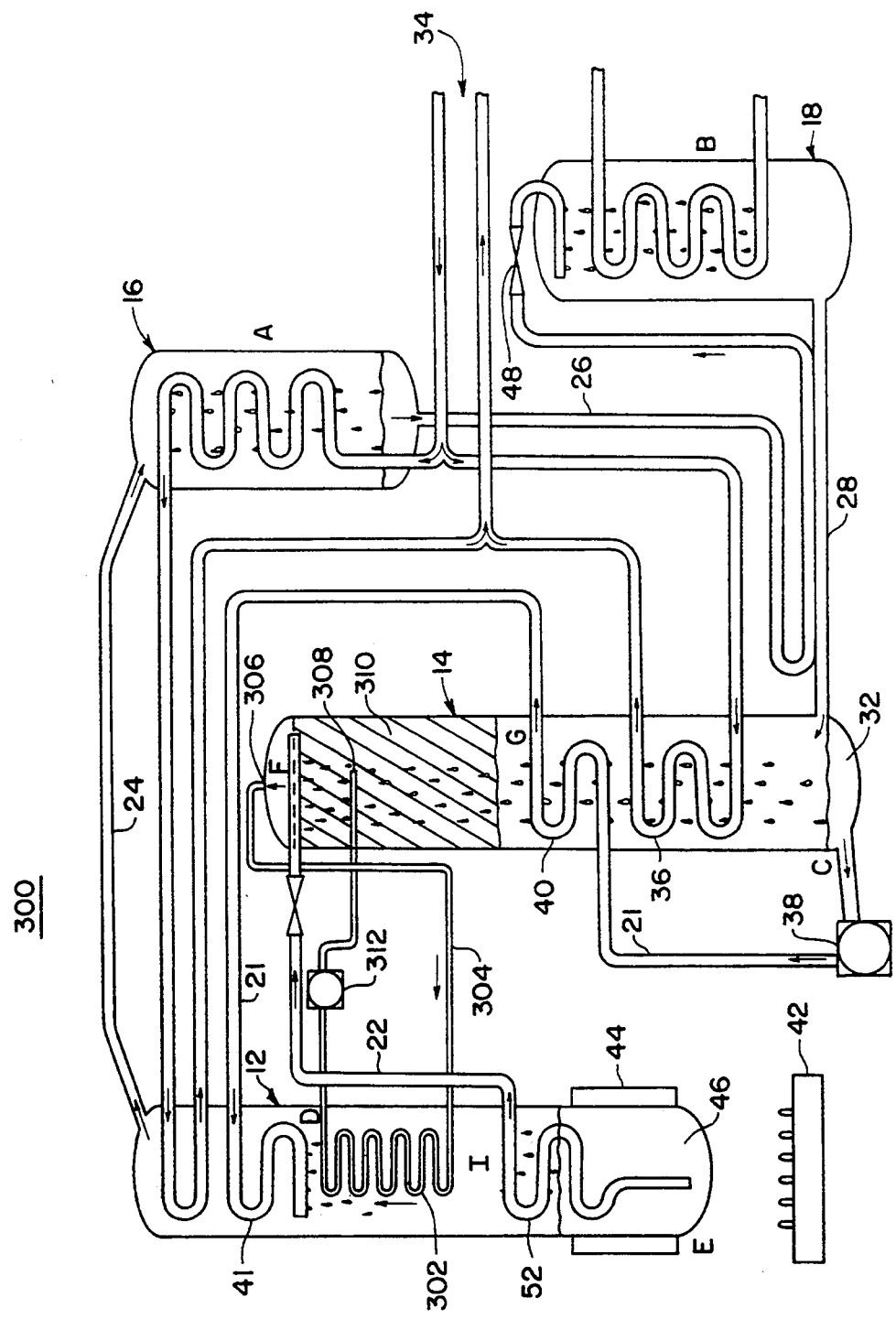
FIG. 6 is a flow diagram of a fourth embodiment of the GAX apparatus of the present invention.

One embodiment of the invention, as shown in FIG. 6, provides an input end in fluid communication with the fluid flow pathway at a location where the liquor is a weak liquor vapor, thus using the weak liquor vapor as the heat transfer medium.

Figure 5:
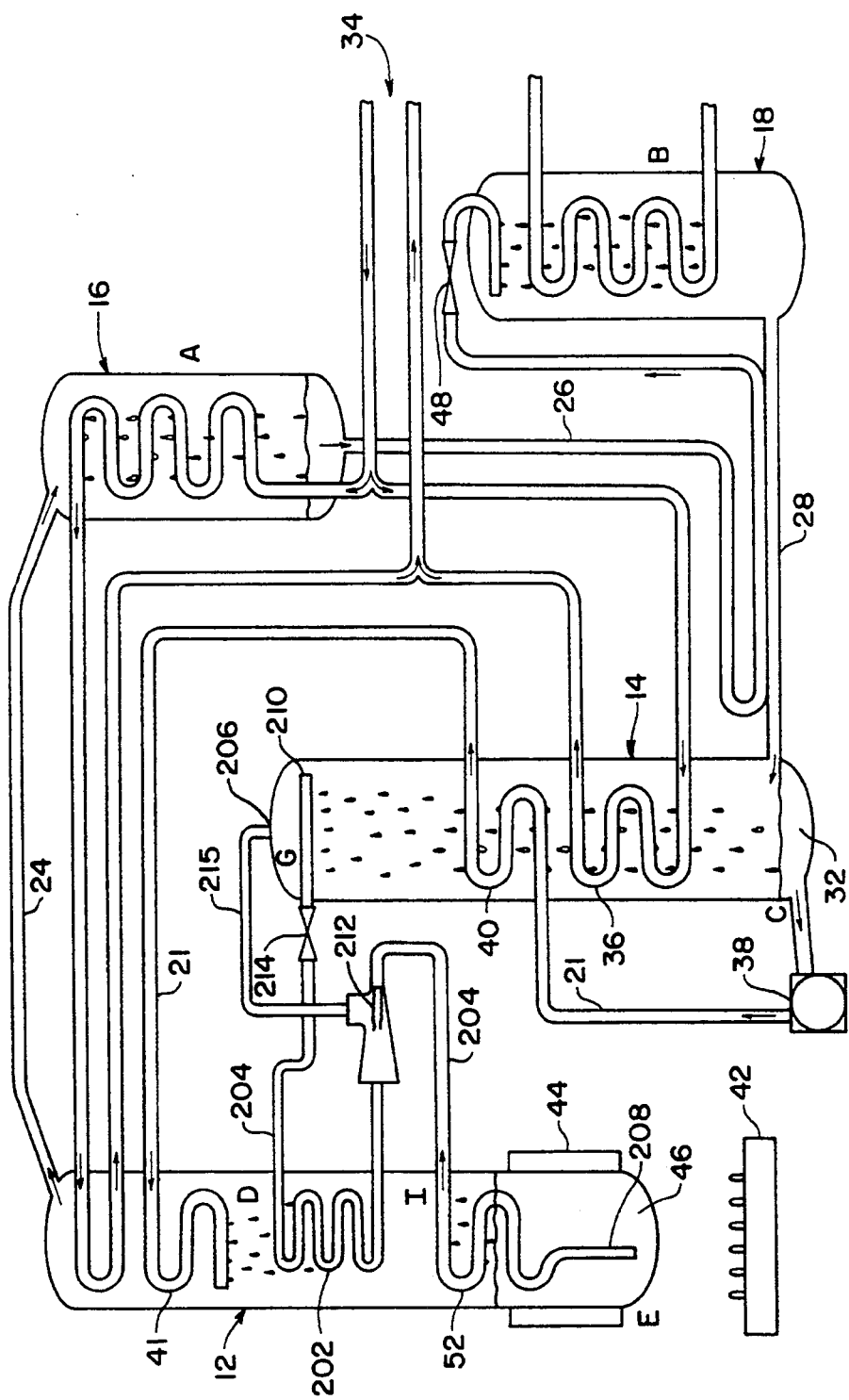
FIG. 5 is a flow diagram of a third embodiment of the GAX apparatus of the present invention.

A further embodiment of the invention, as shown in FIG. 5, provides input ends in fluid communication with the fluid flow pathway at two different locations, one where the liquor is a weak liquor vapor and one where the liquor is a weak liquor liquid, thus using a mixture of weak liquor liquid and weak liquor vapor as the heat transfer medium.

Additional embodiments of the invention, as shown in FIGS. 7, 7A, 8, 8A and 9, provide an input end in fluid communication with the fluid flow pathway where the liquor is a rich liquor, thus using the rich liquor as the heat transfer medium.

In accordance with the invention, as embodied and broadly described herein, the output end of the heat exchange circuit is provided to distribute the portion of the liquor circulated between heat transfer regions into either the generator or the absorber. This output end may be any device capable of distributing a liquid or a vapor/liquid mixture, such as a distributor, and is preferably located at a region of the generator or absorber where the temperature of the liquor exiting the distributor and the temperature of the interior of the generator or absorber immediately adjacent the distributor are essentially equal. Depending on the pressure of the liquor provided to the distributor, a pressure regulating device may be provided upstream of the distributor to regulate flow and/or reduce the pressure of the liquor flowing to the distributor.

In addition, several embodiments of the invention, as shown in FIGS. 3, 3A, 4 and 9, use a substantially single liquid phase working fluid as the heat transfer fluid and thus use the sensible heat of the working fluid. Other embodiments of the invention, as shown in FIGS. 5, 6, 7, 7A, 8 and 8A, use a two phase working fluid as the heat transfer fluid and thus take advantage of the latent heat of the working fluid.

Referring to FIG. 3, a generator-absorber heat exchange apparatus 100 as previously described using a first embodiment of GAX heat transfer apparatus is illustrated. In this embodiment, the heat exchange circuit also serves as the weak liquor pathway and comprises three heat exchange coils 102, 104, 106 located in the heat transfer region of generator 12 and three heat exchange coils 110, 112, 114 located in the heat transfer region of absorber 14. A heat exchange conduit 120 is provided which includes an input end 122 disposed to withdraw weak liquor 46 from the lower end E of generator 12 and a distributor 124 located in the upper end of absorber 14 for distributing the weak liquor. Heat exchange conduit 120 serially interconnects the three generator heat exchange coils 102, 104, 106 with the three absorber heat exchange coils 110, 112, 114 to conduct the weak liquor alternately between heat transfer regions of generator 12 and absorber 14.

In accordance with this embodiment of the invention, weak liquor 46 is withdrawn from input end 122 at high temperature region E of generator 12 and, after being partly cooled by transferring its highest temperature heat to the lower region of generator 12, is conveyed through first heat exchange coil 102. As the relatively hot liquid travels through first heat exchange coil 102, heat is transferred from it to generator 12. Liquid transport pump 128 may optionally be used to provide the motive force for transporting weak liquor 46 from generator 12 to absorber 14 via first portion 130 of heat exchange conduit 120. Alternatively, the pressure differential between generator 12 and absorber 14 may be used to provide the requisite motive force. The cooled, weak liquor is then transported through second heat exchange coil 110 where heat is transferred from the hot upper region of absorber 14 to second heat exchange coil 110 and thus to the weak liquor. After acquiring heat from absorber 14, the weak liquor is then returned via second portion 132 of heat exchange conduit 120 to generator 12 where heat transfer occurs from the weak liquor to generator 12 via third heat exchange coil 104 in generator 12.

After this heat exchange occurs, the liquid then returns to absorber 14 via third portion 134 of heat exchange conduit 120 where it passes through fourth heat exchange coil 112 causing the temperature of the liquid to increase as heat is transferred to it from absorber 14. The weak liquor is then returned via fourth portion 136 of heat exchange conduit 120 to generator 12 where heat transfer occurs via fifth heat exchange coil 106. After this heat exchange, the weak liquor is transported via fifth portion 138 of heat exchange conduit 20 to sixth heat exchange coil 114 in absorber 14. Pressure regulating device 126 is provided upstream of distributor 124 where the pressure of the entering weak liquor is regulated and reduced before entering distributor 114 at the appropriate location in absorber 14, as discussed previously herein. Pressure regulating device 126 may be, for example, a pressure reducing valve or a restriction device, or any device that regulates flow and/or reduces the pressure of the weak liquor entering absorber 14. Distributor 124 provides for the relatively hot weak liquor to pass over second, fourth and sixth heat exchange coils 110, 112, 114, thereby transferring heat to the liquid in these coils which is transferred via the weak liquor to generator 12.

The phase of the weak liquor throughout this embodiment for GAX heat transfer is substantially all liquid. The advantages of this scheme are that a separate heat transfer pathway is eliminated, flow splitters are eliminated, and except for pressure regulating device 126, virtually all flow control means can be eliminated.

In a variation of the first embodiment that is not shown in FIG. 3, an additional pass between generator 12 and absorber 14 is provided. Thus, rather than three passes of the weak liquor between generator 12 and absorber 14 as in the embodiment illustrated by FIG. 3, in this variation, there are four passes between generator 12 and absorber 14. This requires an additional heat exchange coil in generator 12 and an additional heat exchange coil in absorber 14, as well as an additional portion of heat exchange conduit to transport weak liquor from absorber 14 to generator 12 and an additional portion of heat exchange conduit to transport weak liquor from generator 12 back to absorber 14. In accordance with the invention, the number of passes to be used to transfer the optimal amount of heat from absorber 14 to generator 12 is a function of the quantity of heat to be transferred, the flow rate of weak liquor and the specific heat of the weak liquor.

In another variation of the first embodiment of the invention that is illustrated by FIG. 3A, generator 12 and absorber 14 each has four heat exchange coils. However, unlike the embodiments described above, wherein each heat exchange coil spans the full temperature range of the heat transfer region, in the FIG. 3A embodiment only two heat exchange coils in each of the generator and absorber, heat exchange coils 102 and 104 in the generator and heat exchange coils 110 and 112 in the absorber, span the entire heat transfer region. Heat exchange coils 144 and 148 in generator 12 and heat exchange coils 146 and 149 in absorber 14 do not span the full length of the generator and absorber heat transfer regions. Heat exchange coils 144 in generator 12 and 146 in absorber 14 span only the middle and coolest sections of the absorber and generator heat transfer regions. Heat exchange coils 148 and 149 span only the coolest sections of the respective heat transfer regions. By configuring the heat exchange coils in this manner, it is possible to more closely approximate the optimum heat transfer profile for the particular ammonia/water solutions having a weak liquor concentration utilized in this embodiment.

Referring to FIG. 4, a generator-absorber heat exchange apparatus 150 as previously described using a second embodiment of GAX heat transfer is illustrated. In this embodiment, the heat exchange circuit also serves as the weak liquor pathway and comprises a heat exchange coil 152 located in the heat transfer region of generator 12 and a heat exchange coil 154 located in the heat transfer region of absorber 14. A heat exchange conduit 156 is provided which includes an input end 158 disposed to withdraw weak liquor 46 from the lower end E of generator 12 and a distributor 160 located in the upper end of absorber 14 for distributing the weak liquor. Heat exchange conduit 156 serially interconnects generator heat exchange coil 152 and absorber heat exchange coil 154 to conduct the weak liquor alternately between heat transfer regions of generator 12 and absorber 14.

In accordance with this embodiment of the invention, liquid transport pump 162 optionally may be used to circulate weak liquor between heat exchange coil 152 in generator 12 and heat exchange coil 154 in absorber 14.

Alternatively, the motive force for the flow of weak liquor between generator 12 and absorber 14 may be provided by the pressure differential between those components. For instance, liquid transport pump 162 could be a weak liquor activated pump, utilizing the flow of weak liquor from the generator to activate the pump. Also, a jet or ejector 164 could be used in combination with the pressure differential between generator 12 and absorber 14 to circulate weak liquor through heat exchange conduit 156. The terms "jet" and "ejector" as used herein are equivalent and encompass any device which uses the momentum of a flowing vapor or liquid stream to provide the motive force for transporting another vapor or liquid. Such devices have an inlet for high pressure fluid flowing to the jet, an outlet for connection in the stream of flowing vapor or liquid, and a suction port for the vapor or liquid to be transported. Such devices inherently mix the two streams, as both exit the jet through the same outlet.

As weak liquor 46 is circulated by liquid transport pump 162 or jet 164, it enters heat exchange coil 154 via heat exchange conduit 156 where heat is transferred to the weak liquor from the relatively hot absorber 14. After exiting heat exchange coil 154, a portion of the heated liquid is withdrawn at flow control device 166 and directed to distributor 160 located in an upper region of absorber 14. The amount of flow to distributor 160 is governed by flow control device 166, which may be, for example, a valve. The amount of recirculation between heat exchange coils 152 and 154 is determined by the design of liquid transport pump 162 or jet 164 and the pressure drop through heat exchange coils 152 and 154 and heat exchange conduit 156.

Hot weak liquor which is not transported to distributor 160 through flow control device 166 is directed back to heat exchange coil 152 in generator 12, optionally through jet 164, via heat exchange conduit 156 for transfer of heat from the weak liquor to generator 22. The state of the weak liquor in this embodiment is substantially all liquid. The amount of flow of weak liquor between heat exchange coil 152 and heat exchange coil 154 can be controlled to optimize the amount of heat transferred from absorber 14 to generator 12.

Referring to FIG. 5, a generator-absorber heat exchange apparatus 200 as previously described using a third embodiment of GAX heat transfer apparatus is illustrated. In this embodiment the heat exchange circuit also serves as the weak liquor pathway and comprises a heat exchange coil 202 disposed in the heat transfer region of generator 12 and a heat exchange conduit 204. Heat exchange conduit 204 has an input end that is a vapor inlet 206 disposed to receive weak liquor vapor from the upper end of absorber 14, a vapor exit conduit 215 to conduct the weak liquor vapor from vapor inlet 206 to ejector 212 and an input end 208 disposed to receive weak liquor liquid from the lower end of generator 12. Heat exchange conduit 204 also has an output end that is a distributor 210 disposed to distribute a mixture of weak liquor vapor and weak liquor liquid in absorber 14. In this embodiment, the upper portion F-G of absorber 14 is eliminated. The absorption and heat transfer that normally occurs at the top of absorber 14 occurs in this embodiment in heat exchange coil 202 of generator 12. In accordance with this embodiment of the invention, the flow of weak liquor 46 from the bottom of generator 12 to absorber 14 through input end 208 and heat exchange conduit 204 occurs as a result of the pressure differential between these components. The flow of weak liquor through ejector 212 withdraws vapor from the top of absorber 14 through vapor inlet 206 and through vapor exit conduit 215 into the suction port of ejector 212. The weak liquor vapor from the top of absorber 14, which has a concentration of refrigerant that is greater than that of weak liquor liquid, combines with the weak liquor liquid from the high temperature region of generator 12 in ejector 212, wherein the weak liquor vapor and weak liquor liquid are mixed.

From ejector 212, the hot two phase mixture of weak liquor vapor and liquid is circulated to heat exchange coil 202 in generator 12, where at least a portion of the weak liquor vapor, and preferably, substantially all of the weak liquor vapor is absorbed into the weak liquor liquid and the resulting heat is transferred from the hot weak liquor to generator 12. From heat exchange coil 202, the absorbed weak liquor is circulated via heat exchange conduit 204 to distributor 210 at an appropriate location in absorber 14. Pressure regulating device 214 is provided upstream of distributor 210 where the pressure of the entering weak liquor is regulated and reduced before entering absorber 14.

In accordance with this embodiment of the invention, absorber 14 may be shortened, i.e., the top or highest temperature portion of absorber 14 is removed. In this embodiment, there is no heat exchange coil in absorber 14 because the liquor exiting distributor 210, resulting from the absorption of the weak liquor vapor in the weak liquor liquid, is at or near a temperature and concentration equal to that at region G in FIG. 2. By using the latent heat of the weak liquor vapor, all of the GAX heat is transferred from absorber 14 to generator 12 in one pass via heat exchange coil 202.

The advantages of this embodiment of the invention are that the number of heat transfer pathways is reduced, and the absorber height and cost are reduced. However, the amount of GAX heat transfer achieved by this embodiment is less than the maximum that is theoretically available because the mixing of the hot weak liquor liquid with cooler weak liquor vapor results in a temperature that is lower than the possible peak absorber temperature. The heat transfer into generator 12 reduces the temperature of the liquor to the 200° F. range (near location G in FIG. 2). Although this embodiment results in a lower overall efficiency than the optimum GAX system, the efficiency remains greater than other heating methods and many other absorption cycles. The cost advantages from fewer passes and heat exchange coils and the shorter absorber can make this embodiment an attractive, low cost system.

Referring to FIG. 6, a generator-absorber heat exchange apparatus 300 as previously described is illustrated which uses a fourth embodiment of GAX heat transfer apparatus. In this embodiment, the heat exchange circuit comprises a heat exchange coil 302 located in the heat transfer region of generator 12. A heat exchange conduit 304 is provided which includes a vapor inlet 306 preferably located in an uppermost region of absorber 14 to withdraw weak liquor vapor and a distributor 308 disposed to distribute weak liquor vapor condensate in absorber 14. Heat exchange conduit 304 conducts the weak liquor between heat transfer regions of generator 12 and absorber 14. In this embodiment, it is also preferable to use a region of packing material 310 below vapor inlet 306 and above heat exchange coil 40 in absorber 14. Packing material 310 provides a large vapor/liquid contact area, optimizing mass transfer between the vapor and liquid. This enables the temperature of the vapor at the high temperature region of absorber 14 to approximate the temperature of the weak liquor entering the top of absorber 14 from generator 12. The vapor exiting absorber 14 through vapor inlet 306 is weak liquor because it is in equilibrium with weak liquor liquid entering the top of absorber 14. However, because the concentration of the equilibrium vapor is always higher than that of the liquid with which it is in equilibrium, the vapor exiting absorber 14 through vapor inlet 306 has a concentration of refrigerant that is greater than the concentration of refrigerant in the weak liquor liquid from generator 12.

In accordance with this embodiment of the invention, rising weak liquor vapor which has passed through the region of packing material 310 collects in the uppermost region of absorber 14. The weak liquor vapor then passes through vapor inlet 306 and is directed into heat exchange conduit 304 where it flows to generator 12 and enters heat exchange coil 302. As the vapor travels upward through heat exchange coil 302 it enters regions of decreasing temperature thereby causing at least a portion, and preferably substantially all, of the vapor to condense. In addition to vapor condensation, some of the vapor may be absorbed into the condensed liquid. Thus, once the vapor has reached the uppermost region of heat exchange coil 302 it is preferably substantially a single liquid phase. Fluid transport apparatus 312 provides sufficient motive force to transport the liquid back to absorber 14 via heat exchange conduit 304 where it is distributed at an appropriate location through distributor 308.

Fluid transport apparatus 312 is preferably a pump but could also be an ejector. It is envisioned that fluid transport apparatus 312 may be driven by a liquid motor using liquid flow from another point in apparatus 300. It is preferred that fluid transport apparatus 312 be located in heat exchange conduit 304 between heat exchange coil 302 and distributor 308, due to the lower temperature in this portion of the conduit. Alternatively, fluid transport apparatus 312 may be located between vapor inlet 306 and heat exchange coil 302 to transport weak liquor vapor into heat exchange coil 302. In this case, fluid transport apparatus 312 would be a blower. It is preferred that the amount of heat transfer surface area and location of heat exchange coil 302 in generator 12 be such that the condensed vapor exiting generator 12 be substantially in the liquid phase.

The flow rate of both the vapor upstream of heat exchange coil 302 and liquid downstream of heat exchange coil 302 is equal to the total amount of vapor exiting the top of absorber 14 through vapor inlet 306. Thus, the sizing of the components comprising this embodiment of the invention should be such so as to allow vapor at the upper region of absorber 14 to freely exit through vapor inlet 306 without collecting in the upper region of absorber 14.

The advantages of this embodiment of the invention include: only one heat exchange coil is required since heat transfer via condensation requires less heat transfer surface area than single phase heat transfer; and such a heat transfer apparatus is relatively easy to control.

Figure 7:
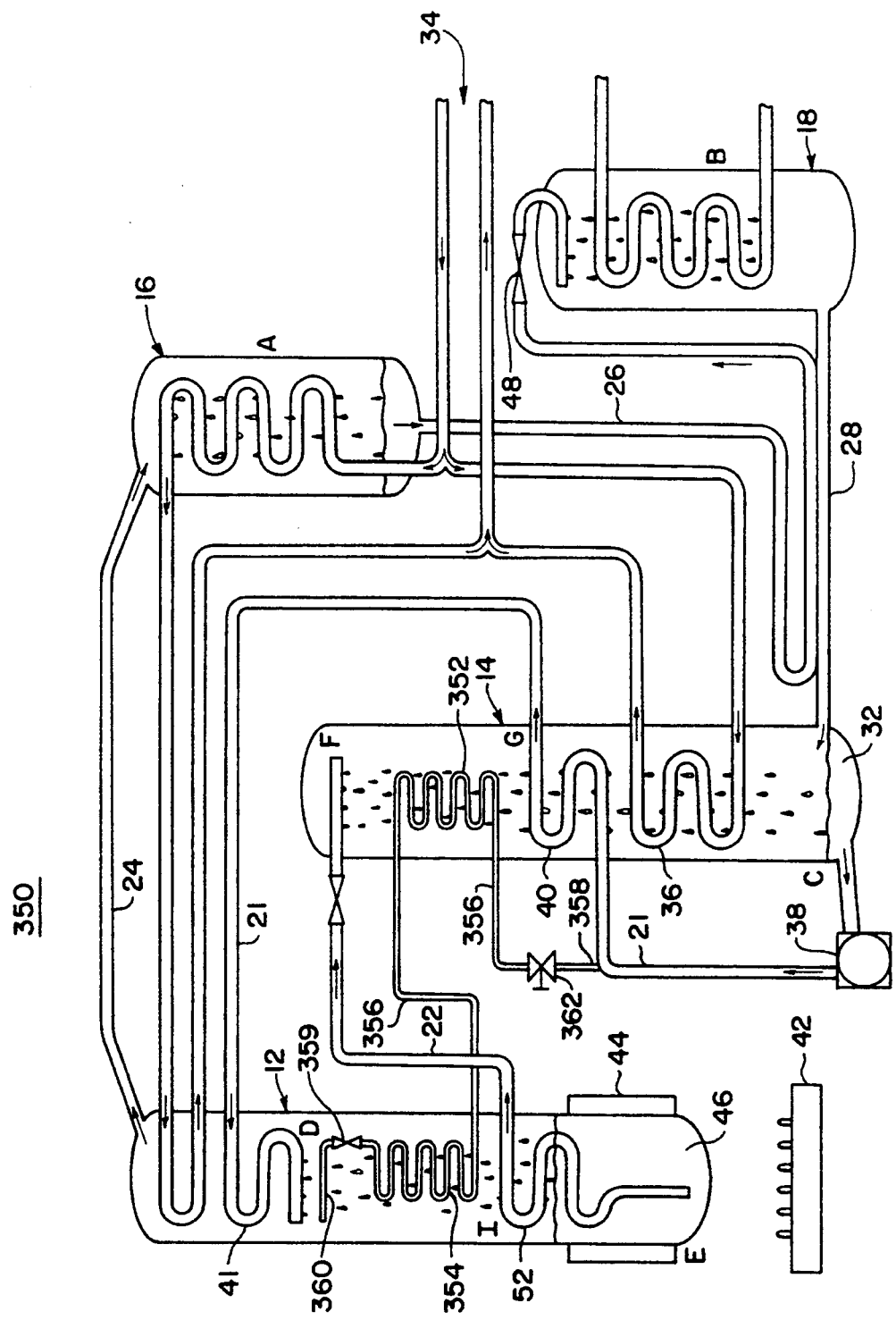
FIG. 7 is a flow diagram of a fifth embodiment of the GAX apparatus of the present invention.

Referring to FIG. 7, a generator-absorber heat exchange apparatus 350 as previously described using a fifth embodiment of GAX heat transfer apparatus is illustrated. In this embodiment, the heat exchange circuit comprises a heat exchange coil 352 located in the heat transfer region of absorber 14 and a heat exchange coil 354 located in the heat transfer region of generator 12. A heat exchange conduit 356 is provided which includes an input end 358 disposed to receive rich liquor from rich liquor pathway 21 and a distributor 360 disposed to distribute rich liquor in generator 12. Heat exchange conduit 356 serially interconnects heat exchange coils 352 and 354 to conduct the rich liquor between heat transfer regions of absorber 14 and generator 12.

In accordance with this embodiment of the invention, a portion of rich liquor 32 may be directed to the GAX heat transfer apparatus through input end 358 in rich liquor pathway 21 by flow control valve 362. The rich liquor liquid in heat exchange conduit 356 then travels upward through heat exchange coil 352 where heat is transferred to it from absorber 14, preferably causing at least a portion of the rich liquor to vaporize. It is preferable to vaporize as much of the rich liquor as necessary to raise the temperature of the rich liquor exiting heat exchange coil 352 to approximate the temperature of the weak liquor entering absorber 14 from generator 12 via weak liquor pathway 22. However, when the generator-absorber heat exchange apparatus of the invention is used in a heat pump apparatus at low outside air temperatures, such as about 5° F. and below, the rich liquor may not vaporize to any appreciable extent in heat exchange coil 352.

The heated two phase flow is then directed through heat exchange conduit 356 to a portion of generator 12 to heat exchange coil 354 where heat is transferred to generator 12 from the two phase rich liquor. The heat transfer to generator 12 from heat exchange coil 354 results from reabsorption of the vapor into the liquid portion of the stream before being fed to an appropriate location in generator 12 through distributor 360. Pressure regulating device 359 may be provided upstream of distributor 360 where the pressure of the entering rich liquor is regulated before entering distributor 360 at the appropriate location in generator 12, as discussed previously herein. Pressure regulating device 359 prevents vapor from exiting through distributor 360 into generator 12.

The flow of rich liquor through heat exchange conduit 356 may be controlled by either flow control valve 362, pressure regulating device 359, or a combination of the two. An additional, optional means of control of the flow in rich liquor pathway 21 is the use of a capillary type restrictor (not shown), which could be useful in restricting vapor flow.

Preferably, flow of the rich liquor is controlled so that the liquid entering absorber 14 in heat exchange conduit 356 is vaporized to the fullest extent possible based upon the operating temperatures of the heat transfer region of absorber 14. Equally preferable, the vapor, or vapor and liquid mixture is then completely condensed and/or absorbed to a single liquid phase at the top of heat exchange coil 354 before being distributed within generator 12 by distributor 360.

The advantages of this embodiment of the invention are that additional pumping transfer apparatus are not required and that such heat transfer apparatus is relatively simple to control. Moreover, once the proportion of liquid flow through flow control valve 362 and/or pressure regulating device 359 is set, this sixth embodiment of GAX heat transfer would essentially not require any further means of control.

Figure 7A:
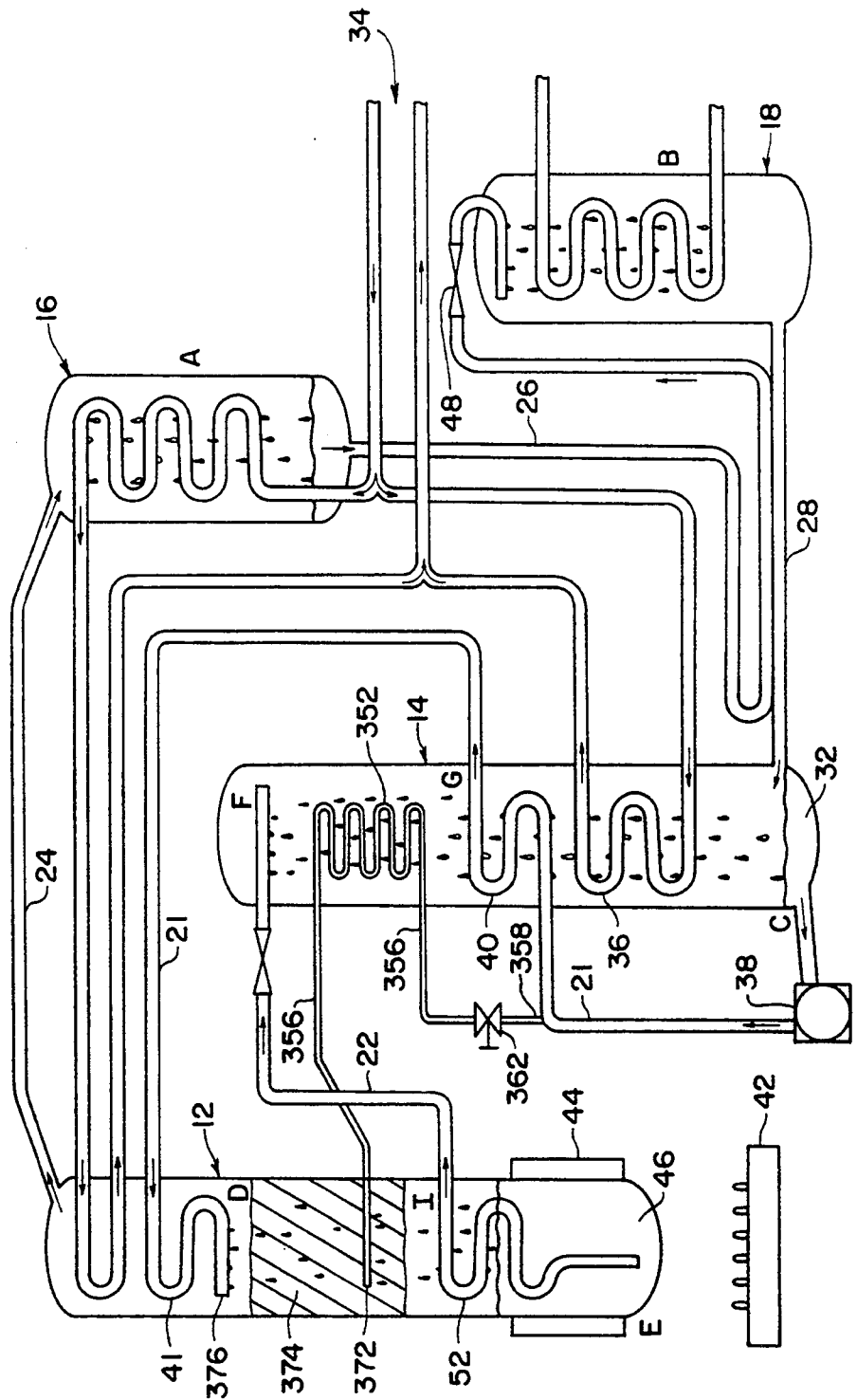
FIG. 7A is a flow diagram of a variation of the fifth embodiment of the GAX apparatus of the present invention.

A variation of this embodiment in accordance with the invention shown by generator-absorber heat exchange apparatus 370 in FIG. 7A is to eliminate heat exchange coil 354 in generator 12 and introduce the two phase rich liquor into generator 12 through distributor 372 at an appropriate location. Distributor 372 in this embodiment should be a device capable of distributing a vapor/liquid mixture and is preferably located in a heat transfer region of generator 12 that has a temperature equal to the temperature of the entering rich liquor. This variation reduces hardware and labor expenses as it eliminates a heat exchange coil.

It is also preferred in this embodiment to use a region of packing material 374 in generator 12 below rich liquor pathway distributor 376. The region of packing material 374 in generator 12 provides a large vapor/liquid contact area, optimizing mass transfer between the vapor and liquid. This enables the temperature of the vapor at the low temperature region of generator 12 to approximate the temperature of the rich liquor entering the top of generator 12 from absorber 14. This packing material can be any of the packing materials commonly used for heat and mass transfer provided it is compatible with the working fluid of the system.

Figure 8:
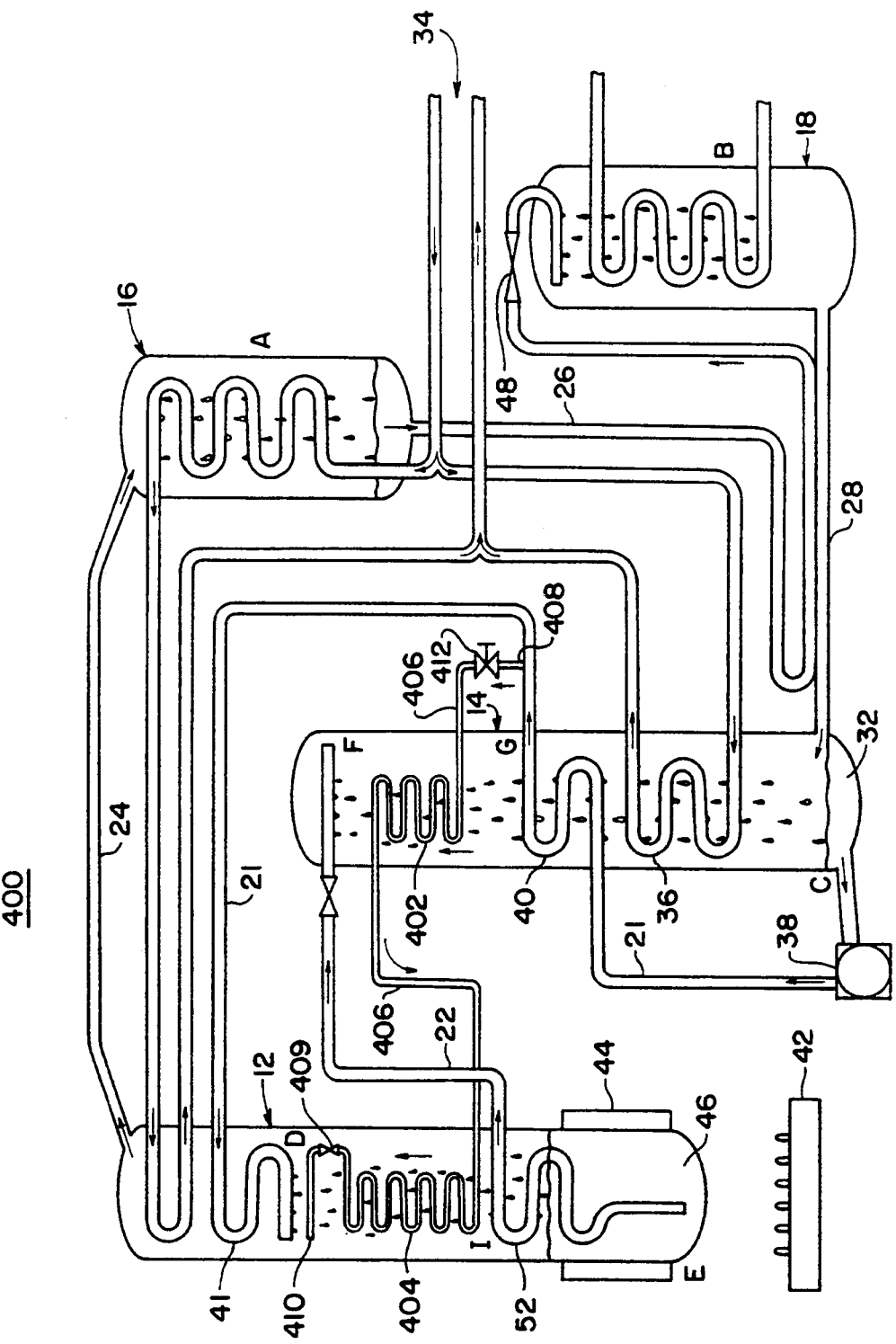
FIG. 8 is a flow diagram of a sixth embodiment of the GAX apparatus of the present invention.

Referring to FIG. 8, a generator-absorber heat exchange apparatus 400 as previously described using a sixth embodiment of GAX heat transfer apparatus is illustrated. In this embodiment the heat exchange circuit comprises a heat exchange coil 402 located in the heat transfer region of absorber 14 and a heat exchange coil 404 located in the heat transfer region of generator 12. A heat exchange conduit 406 is provided which includes an input end 408 disposed to receive rich liquor from rich liquor pathway 21 and a distributor 410 disposed to distribute rich liquor in generator 12. Heat exchange conduit 406 serially interconnects heat exchange coils 402 and 404 to conduct the rich liquor between heat transfer regions of absorber 14 and generator 12.

In accordance with this embodiment of the invention, relatively hot rich liquor is withdrawn at input end 408 on the discharge side of solution pump 38, after the rich liquor has passed through heat exchange coil 40 in absorber 16. Flow control valve 412 may be adjusted to regulate the amount of liquid flow through heat exchange conduit 406. The rich liquor is further heated as it passes through heat exchange coil 402, preferably causing at least a portion of the rich liquor to vaporize. It is preferable to vaporize as much of the rich liquor as necessary to raise the temperature of the rich liquor exiting heat exchange coil 402 to approximate the temperature of the weak liquor entering the high temperature region of absorber 14 from generator 12. However, when the generator-absorber heat exchange apparatus of the invention is used in a heat pump apparatus at low outside air temperatures, such as about 5° F. and below, the rich liquor may not vaporize to any appreciable extent.

The heated two phase flow is then transported to generator 12 through heat exchange conduit 406. Once the hot two phase rich liquor enters heat exchange coil 404, heat is transferred to the cooler generator 12. The heat transfer to generator 12 from heat exchange coil 404 results in substantial reabsorption of the vapor into the liquid. The exiting liquid is then distributed at an appropriate location within generator 12 by distributor 410. Pressure regulating device 409 is provided upstream of distributor 410 where the pressure of the entering rich liquor is regulated before entering distributor 410 at the appropriate location in generator 12, as discussed previously herein. Pressure regulating device 409 prevents vapor from exiting through distributor 410 into generator 12.

The flow of rich liquor through heat exchange conduit 356 may be controlled by either flow control valve 412, pressure regulating device 409, or a combination of the two. An additional, optional means of control of the flow in rich liquor pathway 21 is the use of a capillary type restrictor (not shown), which could be useful in restricting vapor flow.

Preferably, the flow of rich liquor is controlled so that the rich liquor entering heat exchange coil 402 in absorber 14 is vaporized to the fullest extent possible based upon the operating temperatures of the heat transfer region of absorber 14. Equally preferable, the vapor, or vapor and liquid mixture is then completely condensed or reabsorbed to a single liquid phase at the top of heat exchange coil 404 before being distributed within generator 12 by distributor 410.

A primary distinction between the embodiment of the invention illustrated in FIG. 8 and the embodiment illustrated in FIG. 7 is the location at which rich liquor is withdrawn from rich liquor pathway 21, and therefore the temperature of the liquor. In the embodiment illustrated in FIG. 7, the rich liquor is withdrawn at input end 358, located on the upstream side of heat exchanger 40. A typical temperature of liquid at this point is approximately 100° F. In the embodiment illustrated in FIG. 8, the rich liquor is withdrawn at input end 408, located on the downstream side of heat exchanger 40. A typical temperature of liquid at this point in the system may approach 200° F. The choice of which embodiment to use depends upon the overall system design parameters. Moreover, there may be some preferences between the schemes in view of the fact that the rich liquor passing through heat exchange coil 402 in the FIG. 8 embodiment will be hotter and thus more likely to be in a vapor phase than the rich liquor passing through heat exchange coil 352 in the FIG. 7 embodiment.

However, there may be reasons for using the embodiment illustrated in FIG. 7 rather than the embodiment illustrated in FIG. 8 due to the higher average temperature of fluid in the FIG. 8 embodiment. Referring to the embodiment shown in FIG. 8, the amount of heat to be transferred to the rich liquor in heat exchange coil 40 relative to that transferred in heat exchange coil 41 is a function of the outdoor temperature at which the generator-absorber heat exchange apparatus is operating. Thus, the liquid temperature at input end 408 will vary more than the liquid temperature at input end 358 in the embodiment of FIGS. 7 and 7A. The varying temperature could adversely affect flow control valve 412. In such a case, the FIG. 7 embodiment may be preferable.

Moreover, standard valve materials could be used for flow control valve 362 in the FIG. 7 embodiment as it would most likely contact liquid having a temperature of approximately 100° F., unlike flow control valve 412 in the FIG. 8 embodiment, which would most likely contact fluid having a temperature of about 200° F.

Figure 8A:
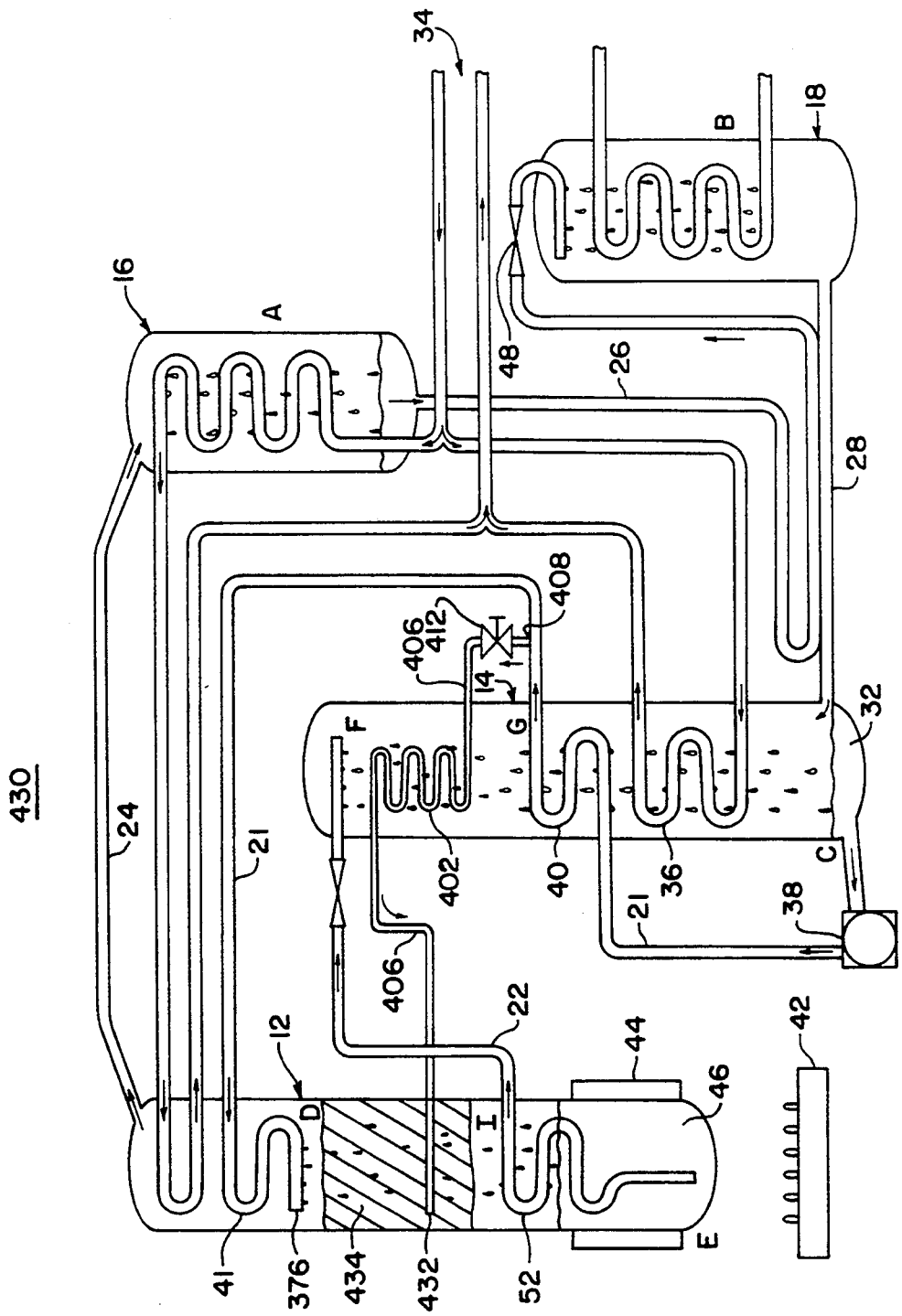
FIG. 8A is a flow diagram of a variation of the sixth embodiment of the GAX apparatus of the present invention.

Another variation of the FIG. 8 embodiment of the invention that is illustrated by the generator-absorber heat exchange apparatus in FIG. 8A is to eliminate heat exchange coil 404 in generator 12 and introduce the rich liquor into generator 12 through distributor 432 at an appropriate location. Distributor 432 in this embodiment should be a device capable of distributing a vapor/liquid mixture and is preferably located in a region of generator 12 where the temperature of the rich liquor exiting distributor 432 and the temperature of generator 12 immediately adjacent distributor 432 are equal. This variation reduces hardware and labor expenses as it eliminates a heat exchange coil. As in FIG. 7A, it is also preferred in this embodiment to use a region of packing material 434 in generator 12 located below rich liquor pathway distributor 376.

Figure 9:
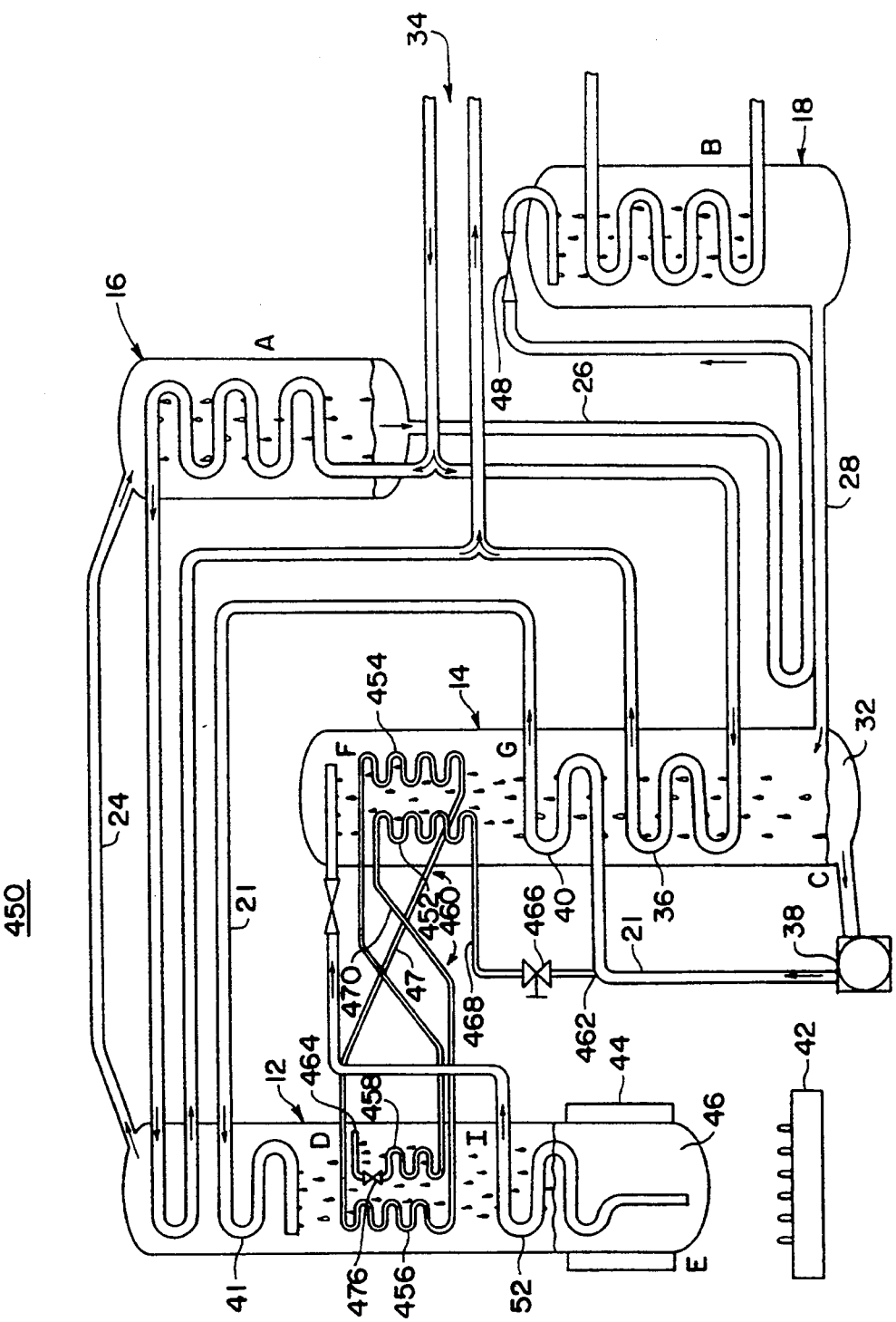
FIG. 9 is a flow diagram of a seventh embodiment of the GAX apparatus of the present invention.

Referring to FIG. 9, a generator-absorber heat exchange apparatus 450 as previously described using a seventh embodiment of GAX heat transfer apparatus is illustrated. In this embodiment, the heat exchange circuit comprises two heat exchange coils 452, 454 located in the heat transfer region of absorber 14 and two heat exchange coils 456, 458 located in the heat transfer region of generator 12. A heat exchange conduit 460 is provided which includes an input end 462 disposed to receive rich liquor from rich liquor pathway 21 and a distributor 464 disposed to distribute rich liquor in generator 12. Heat exchange conduit 460 serially interconnects heat exchange coils 452, 454, 456, 458 to conduct the rich liquor between heat transfer regions of absorber 14 and generator 12.

In accordance with this embodiment of the invention, rich liquor may be withdrawn from rich liquor pathway 21 at input end 462 through flow control valve 466. Solution pump 38 provides the motive force for transporting the rich liquor between absorber 14 and generator 12 and pressurizes the rich liquor so that it is not vaporized in heat exchange coils 452, 454, 456 and 458. Flow control valve 466 may be used to regulate the flow rate and pressure of the rich liquor so that at the temperatures of absorber 14, the rich liquor remains substantially in the liquid state. From flow control valve 466, the rich liquor is provided via first portion 468 of heat exchange conduit 460 to heat exchange coil 452 in the heat transfer region of absorber 14 where heat from absorber 14 is transferred to the rich liquor.

The heated rich liquor is then transported from absorber 14 to generator 12 through second portion 470 of heat exchange conduit 460 to heat exchange coil 456 in the heat transfer region of generator 12 where heat is transferred from the rich liquor to generator 12. The rich liquor is then circulated from the exit of heat exchange coil 456 in generator 12 to heat exchange coil 454 in absorber 14 through third portion 472 of heat exchange conduit 460, where heat is transferred from absorber 14 to the rich liquor. The heated rich liquor from heat exchange coil 454 is then circulated through fourth portion 474 of heat exchange conduit 460 to heat exchange coil 458 in the heat transfer region of generator 12 where heat is transferred from the heated rich liquor to generator 12. From heat exchange coil 458, the rich liquor is provided to distributor 464.

Pressure regulating device 476 may be provided upstream of distributor 464 where the pressure of the rich liquor is regulated before entering generator 12. Distributor 464 distributes the rich liquor liquid into an appropriate location in generator 12. The flow of rich liquor from solution pump 38 to distributor 464 may be controlled by either flow control valve 466, pressure regulating device 476, or a combination of the two. An additional, optional means of control of the flow in rich liquor pathway 21 is the use of a capillary type restrictor (not shown), which could be useful in restricting vapor flow.

The flow of rich liquor is controlled so that the phase of the rich liquor throughout this FIG. 9 embodiment of the invention is substantially all liquid. The advantages of this scheme are that an additional fluid transport apparatus for GAX heat transfer is not needed and that such heat transfer apparatus is relatively simple to control. Once the proportion of liquid flow through flow control valve 466 is set, this seventh embodiment of GAX heat transfer would essentially not require any further means of control.

In another variation of this embodiment that is not shown in FIG. 9, an additional pass between generator 12 and absorber 14 is provided. Thus, rather than two passes of the rich liquor between absorber 14 and generator 12 as in the embodiment illustrated by FIG. 9, in this alternative variation, there are three passes between absorber 14 and generator 12. This requires an additional heat exchange coil in generator 12 and an additional heat exchange coil in absorber 14, as well as additional portions of conduit to transport rich liquor from generator 12 to absorber 14 and from absorber 14 back to generator 12. In accordance with the invention, the number of passes to be used to transfer the optimal amount of heat from absorber 14 to generator 12 is a function of the quantity of heat to be transferred, the overlap temperature range, the flow rate of rich liquor and the specific heat of the rich liquor.

In all of the embodiments of the invention described herein and variations thereof, it is preferable to orient the flow of liquid, vapor, or liquid and vapor mixture vertically upwards when passing such through a heat exchange coil in either the generator or absorber. This flow orientation generally best matches the temperature gradients in the absorber and generator and provides the best counterflow temperature differentials between the rising coil contents and falling liquid.

In accordance with the embodiments of the GAX heat transfer apparatus described herein, the heat exchange coils can be located in the interior of the generator and absorber. Alternatively, in accordance with the invention, the heat exchange coils can be located at the exterior of the generator and absorber adjacent to and/or in heat transfer contact with the region in which heat transfer is desired. The term "heat transfer region" as used herein is meant to include the interior of the generator or absorber, as well as regions outside the generator or absorber adjacent to and/or in heat transfer contact with the region in which heat transfer is desired.

Figure 10:
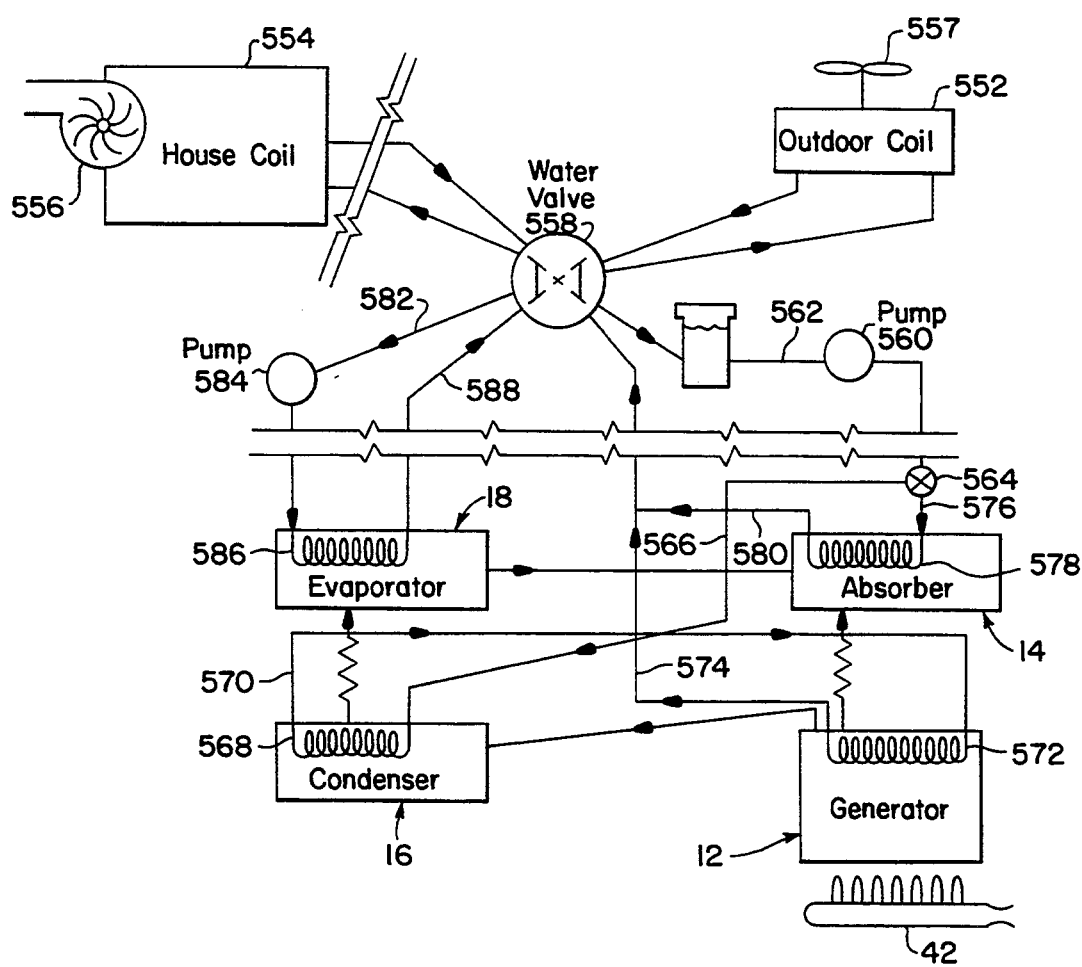
FIG. 10 is a flow diagram of the heat pump of the present invention using the generator-absorber, heat exchange apparatus of the invention.

Referring to FIG. 10, a heat pump 550 is provided which uses one of the generator-absorber heat exchange apparatuses of the invention. The heat pump 550 includes an outdoor heat exchange coil 552 and an indoor heat exchange coil 554. Indoor heat exchange coil 554 may optionally include an air transport apparatus 556, such as a fan or blower for supplying heated or cooled air into a building. Outdoor heat exchange coil 552 may also optionally include an air transport apparatus 557, such as a fan or blower. Outdoor and indoor heat exchange coils 552 and 554, and air transport apparatuses 556 and 557, can be any of the standard, known equipment used in heat pump or air conditioning systems.

Heat pump 550 is comprised of two major sections, the generator-absorber heat exchange apparatus (absorption unit) and the antifreeze fluid system. The generator absorber heat exchange apparatus in accordance with the invention can be made up of the components discussed earlier herein, including an absorber 14, generator 12, condenser 16 and evaporator 18. The antifreeze fluid system is divided into a cold fluid circuit and a hot fluid circuit. The antifreeze fluids that can be used in accordance with the invention include those fluids known to be useful in transferring heat. A preferred antifreeze fluid is a water solution including an antifreeze liquid that is non-toxic and non-flammable, such as, for example, propylene glycol.

Contrary to standard heat pump systems that reverse the refrigeration circuit to change from cooling to heating, heat pump 550 of the invention, rather than reversing the refrigeration circuit, uses a system flow control apparatus 558, which is preferably an eight-way valve, that is capable of reversing the antifreeze circuits. System flow control apparatus 558 makes it possible to direct the antifreeze fluids from either the cold evaporator 18 or the hot condenser 16, absorber 14 and generator 12 either to the outdoor heat exchange coil 552 or to the indoor heat exchange coil 554.

The cold antifreeze circuit comprises evaporator 18, which chills the antifreeze fluid via evaporator heat exchange coil 586, extracting from the antifreeze fluid the heat removed from the house or building in the summer or from the outdoor air in winter.

The hot antifreeze circuit comprises absorber 14, condenser 16 and generator 12, which raise the temperature of the extracted heat to well above 100° F. The sum of the heat outputs of absorber 14, condenser 16 and generator 12 is equal to the sum of the two heat input quantities, one from the gas flame and the other being the low temperature heat input to evaporator 18. Absorber 14, generator 12 and condenser 16 transfer the system output heat to the hot antifreeze fluid via absorber heat exchange coil 578, generator heat exchange coil 572 and condenser heat exchange coil 568. In the winter, the hot antifreeze fluid transfers much more heat to the house or building than that from the gas flame. In most areas of the United States, supplemental heat should not be required.

In one specific embodiment of the heat pump of the invention, illustrated in FIG. 10, the hot antifreeze circuit includes a first conduit 562 which transports the antifreeze fluid from system flow control apparatus 558 to a first flow control device 564, which can be, for instance, a flow splitter. A fluid transport apparatus 560, such as a pump, is used to circulate the antifreeze fluid through the hot antifreeze circuit. Fluid transport apparatus 560 can be located anywhere in the hot antifreeze circuit, but is preferably located in first conduit 562.

In accordance with this embodiment, a first portion of the antifreeze fluid from first conduit 562 is directed via first flow control device 564 to a second conduit 566, which transports the antifreeze fluid to condenser heat exchange coil 568. In condenser heat exchange coil 568, heat is transferred from condenser 16 to the antifreeze fluid. The antifreeze fluid is transported from condenser heat exchange coil 568 to generator reflux heat exchange coil 572 via third conduit 570. In generator reflux heat exchange coil 572, heat is transferred from generator 12 to the antifreeze fluid. The antifreeze fluid is transported from generator reflux heat exchange coil 572 back to system flow control apparatus 558 via fourth conduit 574.

A second portion of the antifreeze fluid in this embodiment from first conduit 562 is directed via first flow control device 564 to a fifth conduit 576, which transports the antifreeze fluid to absorber heat exchange coil 578. In absorber heat exchange coil 578, heat is transferred from absorber 14 to the antifreeze fluid. The antifreeze fluid is transported from absorber heat exchange coil 578 via sixth conduit 580 into fourth conduit 574 and back to system flow control apparatus 558.

The particular flow arrangement for the hot antifreeze circuit illustrated by FIG. 10 is meant to be illustrative only and should not limit the invention. Other flow arrangements for the antifreeze fluid between absorber 14, condenser 16 and generator 12 are within the scope of the invention. For example, the flow of antifreeze fluid through absorber 14, condenser 16 and generator 12 may be in parallel or in series. However, it is preferred that the flow through condenser 16 and absorber 14 be in parallel, as shown in FIG. 10.

The cold antifreeze circuit includes a first conduit 582 which circulates antifreeze fluid from system flow control apparatus 558 to evaporator heat exchange coil 586. In evaporator heat exchange coil 586, heat is transferred from the antifreeze fluid to evaporator 18. The antifreeze fluid is transported from evaporator heat exchange coil 586 back to system flow control apparatus 558 via second conduit 588. A fluid transport apparatus 584, such as a pump, is used to circulate the antifreeze fluid through the cold antifreeze circuit. Fluid transport apparatus 584 can be located elsewhere in the cold antifreeze circuit, but is preferably located in first conduit 582. The particular flow arrangement for the cold antifreeze circuit illustrated by FIG. 10 is meant to be illustrative only and should not limit the scope of the invention.

System flow control apparatus 558 directs the cold antifreeze to indoor heat exchange coil 554 in summer and to outdoor heat exchange coil 552 in winter, at the same time directing the hot antifreeze to outdoor heat exchange coil 552 in summer and to indoor heat exchange coil 554 in winter. This method of reversing the flows to meet the household or building needs for heating or cooling also can also be used during the winter to defrost outdoor heat exchange coil 552, when desired, by reversing the flow to direct hot antifreeze to outdoor heat exchange coil 552.

The choice of materials of construction for all the embodiments described herein and variations thereof depends upon the components of the working fluid, i.e., the refrigerant and absorbent, and the expected operating pressure and temperature ranges. For an ammonia and water absorption solution operating up to about 300° F. (thus excluding the lower region of the generator) and pressures up to about 300 psia, mild steel is the preferred choice of material for all components contacting the solution. The choice of materials of construction for other solutions should be known to those skilled in the art of absorption systems.

While the various GAX heat transfer means described herein have been illustrated in a residential or light commercial heat pump, their benefits are not limited to such applications. The enhanced performance provided by the various GAX heat transfer schemes set forth herein may be applied to processes requiring medium temperature heating and cooling such as brewing, food processing, pasteurizing and paper making, to mention but a few examples. Furthermore, the principles of the invention are not limited to absorption heat pump cycles that efficiently convert heat from a combination of low and high temperature heat sources to heat at a medium temperature. The invention is equally applicable to heat transformers which convert heat from a medium-high temperature, such as hot waste water discharged from a processing plant, to produce a useful high temperature output plus a lower temperature output.

It will be apparent to those skilled in the art that various modifications and variations can be made in the generator-absorber heat exchange apparatus, heat pump and method of transferring heat between the generator and absorber without departing from the spirit or scope of the invention. Thus, it is intended that the present invention cover the modifications and variations of this invention provided that they come within the scope of the appended claims and their equivalents.

What is claimed is:

1. In a generator-absorber heat exchange apparatus including a generator and an absorber, the absorber having an interior pressure lower than the pressure of the generator interior and each having high and low temperature regions at opposite ends establishing respective temperature ranges and a heat transfer region, the temperature ranges defining the respective heat transfer regions overlapping, and a fluid flow pathway circulating a weak liquor from the high temperature region of the generator and a rich liquor from the low temperature region of the absorber to and through the high temperature, heat transfer and low temperature regions of the generator and the absorber, the improvement comprising:
a heat exchange circuit receiving a portion of the liquor from the fluid flow pathway and circulating said portion of the liquor between said heat transfer regions transfering heat from the absorber to the generator.

2. The apparatus of claim 1 wherein the heat exchange circuit comprises a heat exchange element disposed in the heat transfer region of one of the generator and the absorber and a conduit conducting said portion of the liquor from the fluid flow pathway to the heat exchange element and to the heat transfer region of the other of the generator and the absorber.

3. The apparatus of claim 1 wherein the heat exchange circuit comprises a plurality of heat exchange elements, at least one being disposed in the heat transfer region of each of the generator and absorber, and a conduit conducting said portion of the liquor from the fluid flow pathway serially to each heat exchange element alternately between heat transfer regions.

4. The apparatus of claim 1 wherein the heat exchange circuit further comprises a heat exchange circuit pump for circulating said portion of the liquor.

5. The apparatus of claim 1 wherein the heat exchange circuit further comprises an ejector for circulating said portion of the liquor.

6. The apparatus of claim 1 wherein the pressure differential between generator and absorber provides the motive force for circulating said portion of the liquor.

7. The apparatus of claim 1 wherein the heat exchange circuit further comprises an input end in fluid communication with the fluid flow pathway and an output end for distributing said portion of the liquor within one of the generator and the absorber.

8. The apparatus of claim 7 wherein the heat exchange circuit further comprises a pressure regulator upstream of the output end.

9. The apparatus of claim 7 wherein the input end is in fluid communication with the fluid flow pathway at a location where the liquor is a rich liquor liquid.

10. The apparatus of claim 7 wherein the input end is in fluid communication with the fluid flow pathway at a location where the liquor is a weak liquor vapor.

11. The apparatus of claim 7 wherein a first input end is in fluid communication with the fluid flow pathway at a location where the liquor is a weak liquor vapor and a second input end is in fluid communication with the fluid flow pathway at a location where the liquor is a weak liquor liquid.

12. The apparatus of claim 7 wherein the input end is in fluid communication with the fluid flow pathway at a location where the liquor is a weak liquor liquid.

13. The apparatus of claim 1 wherein the portion of the liquor circulated between heat transfer regions of the generator and absorber is substantially in the liquid state.

14. The apparatus of claim 1 wherein the portion of the liquor circulated between heat transfer regions of the generator and absorber is a two phase mixture of liquid and vapor in at least a portion of the heat exchange circuit.

15. A generator-absorber heat exchange apparatus comprising:
a generator containing a liquor having a concentration gradient extending from rich proximate an upper end to weak proximate a lower end and a temperature gradient extending from low proximate the upper end to high proximate the lower end;
an absorber having a pressure in its interior lower than the interior pressure of the generator and containing a liquor having a concentration gradient extending from weak proximate an upper end to rich proximate a lower end and a temperature gradient extending from high proximate the upper end to low proximate the lower end;
a rich liquor conduit having an inlet in fluid communication with the absorber proximate the lower end thereof and an outlet disposed in the generator proximate the upper end thereof distributing rich liquor from the lower end of the absorber for passage along the concentration and temperature gradients of the generator;
a pump in fluid communication with the rich liquor conduit moving fluid through the conduit from the absorber to the generator;
a weak liquor conduit having an inlet in fluid communication with the generator proximate the lower end thereof and an outlet disposed in the absorber proximate the upper end thereof distributing weak liquor from the lower end of the generator for passage along the concentration and temperature gradients of the absorber;
a heater disposed to heat liquor in the generator proximate the lower end thereof; and
a heat exchange circuit comprising:
at least one heat exchange element disposed in one of the absorber and generator in a heat transfer region thereof, said heat transfer regions of the generator and absorber having overlapping temperatures;
a heat exchange conduit having an input end receiving liquor from at least one of the absorber, the generator, the rich liquor conduit and the weak liquor conduit and an output end distributing the liquor in one of the absorber and generator, the conduit conveying the liquor between the heat transfer regions of the absorber and the generator thereby transfering heat therein.

16. The apparatus of claim 15 wherein said heat exchange circuit comprises:
at least three heat exchange elements disposed in the heat transfer region of the generator and at least three heat exchange elements disposed in the heat transfer region of the absorber;
a heat exchange conduit having said input end disposed to receive weak liquor from the lower end of the generator and said output end disposed to distribute said weak liquor to the upper end of the absorber, said heat exchange conduit serially interconnecting said heat exchangers to conduct said weak liquor alternately between the generator and absorber heat transfer regions.

17. The apparatus of claim 16 wherein the heat exchange circuit further comprises a heat exchange circuit pump for circulating said weak liquor.

18. The apparatus of claim 16 wherein the motive force for circulating said weak liquor is provided by the pressure differential between said absorber and generator.

19. The apparatus of claim 16 wherein the heat exchange circuit further comprises a pressure regulator upstream of the output end.

20. The apparatus of claim 16 wherein the weak liquor circulated between heat transfer regions of the generator and absorber is substantially in the liquid state.

21. The apparatus of claim 15 wherein said heat exchange circuit comprises:
a heat exchange element disposed in the heat transfer region of the generator and a heat exchange element disposed in the heat transfer region of the absorber;
a heat exchange conduit having said input end disposed to receive weak liquor from the lower end of the generator and said output end disposed to distribute said weak liquor to the upper end of the absorber, said heat exchange conduit serially interconnecting said heat exchange elements to conduct said weak liquor alternately between the generator and absorber heat transfer regions.

22. The apparatus of claim 21 wherein the heat exchange circuit further comprises a heat exchange circuit pump for circulating said weak liquor.

23. The apparatus of claim 21 wherein the motive force for circulating said weak liquor is provided by the pressure differential between said absorber and generator and by an ejector in the heat exchange circuit.

24. The apparatus of claim 21 wherein the heat exchange circuit further comprises a flow control device upstream of the distributor end.

25. The apparatus of claim 21 wherein the weak liquor circulated between heat transfer regions of the generator and absorber is substantially in the liquid state.

26. The apparatus of claim 15 wherein said heat exchange circuit comprises:
a heat exchange element disposed in the heat transfer region of the generator;
a heat exchange conduit having a first input end disposed to receive weak liquor vapor from the upper end of the absorber and a second input end disposed to receive weak liquor from the lower end of the generator, and having said output end disposed to distribute a mixture of said weak liquor vapor and weak liquor liquid in the generator.

27. The apparatus of claim 26 wherein said heat exchange circuit further comprises an ejector for withdrawing said weak liquor vapor from the absorber and mixing the weak liquor vapor and weak liquor liquid.

28. The apparatus of claim 26 wherein the heat exchange circuit further comprises a pressure regulator upstream of the distributor end.

29. The apparatus of claim 26 wherein the mixture of weak liquor vapor and weak liquor liquid circulated between heat transfer regions of the generator and absorber is a two phase mixture of liquid and vapor in at least a portion of the heat exchange circuit.

30. The apparatus of claim 15 wherein said heat exchange circuit comprises:
a heat exchange element disposed in the heat transfer region of the generator;
a heat exchange conduit having said input end disposed to receive weak liquor vapor from the upper end of the absorber and said output end disposed to distribute the condensate of said weak liquor vapor in the absorber.

31. The apparatus of claim 30 wherein the weak liquor vapor circulated between heat transfer regions of the generator and absorber is a two phase mixture of liquid and vapor in at least a portion of the heat exchange circuit.

32. The apparatus of claim 30 wherein the heat exchange circuit further comprises a pump for circulating the weak liquor vapor condensate.

33. The apparatus of claim 30 wherein the heat exchange circuit comprises a pressure regulator upstream of the output end.

34. The apparatus of claim 15 wherein said heat exchange circuit comprises:
a heat exchange element disposed in the heat transfer region of the absorber;
a heat exchange conduit having said input end disposed to receive rich liquor from the rich liquor conduit and said output end disposed to distribute said rich liquor in the generator.

35. The apparatus of claim 34 wherein the rich liquor circulated between heat transfer regions of the generator and absorber is a two phase mixture of liquid and vapor in at least a portion of the heat exchange circuit.

36. The apparatus of claim 34 wherein the heat exchange circuit further comprises a heat exchange circuit pump for circulating said rich liquor.

37. The apparatus of claim 34 wherein the heat exchange circuit comprises a pressure regulator upstream of the output end.

38. The apparatus of claim 34 wherein said rich liquor distributed in the generator is a two phase mixture of liquid and vapor.

39. The apparatus of claim 34 wherein said heat exchange circuit further comprises a heat exchange element disposed in the heat transfer region of the generator, said heat exchange conduit serially interconnecting said heat exchange elements to conduct said rich liquor between the absorber and generator.

40. The apparatus of claim 39 wherein said rich liquor distributed in the generator is in the liquid phase.

41. The apparatus of claim 15 wherein said heat exchange circuit comprises:
at least two heat exchange elements disposed in the heat transfer region of the absorber and at least two heat exchange elements disposed in the heat transfer region of the generator;

a heat exchange conduit having said input end disposed to receive rich liquor from the rich liquor conduit and said output end disposed to distribute said rich liquor in the generator, said heat exchange conduit serially interconnecting said heat exchange elements to conduct said rich liquor alternately between the generator and absorber heat transfer regions.

42. The apparatus of claim 41 wherein the rich liquor circulated between heat transfer regions of the generator and absorber is substantially in the liquid state.

43. The apparatus of claim 41 wherein the motive force for circulating the rich liquor is provided by the pump in the rich liquor conduit.

44. The apparatus of claim 41 wherein the heat exchange circuit comprises a pressure regulator upstream of the output end.

45. The apparatus of claim 41, further comprising a heat exchange circuit pump for circulating the rich liquor in the heat exchange conduit.

46. A heat pump comprising:

an indoor liquid-air heat exchanger;

an outdoor liquid-air heat exchanger;

a generator-absorber heat exchange apparatus comprising:

a generator and an absorber, the absorber having an interior pressure lower than the interior pressure of the generator and each having high and low temperature regions at opposite ends establishing respective temperature ranges and a heat transfer region, the temperature ranges defining respective heat transfer regions overlapping;

a fluid flow pathway circulating a weak liquor from the high temperature region of the generator and a rich liquor from the low temperature region of the absorber to and through the high temperature, heat transfer and low temperature regions of the generator and the absorber;

a heat exchange circuit receiving a portion of the liquor from the fluid flow pathway and circulating the portion of the liquor between the heat transfer regions of the generator and the absorber thereby transfering heat therein; and an antifreeze circuit circulating antifreeze fluid between each of the indoor and outdoor heat exchangers and the generator-absorber heat exchange apparatus selectively extracting heat from one of said heat exchangers and transferring heat to the other of said heat exchangers.

47. The heat pump of claim 46 wherein said generator-absorber heat exchange apparatus comprises the apparatus of claim 1.

48. The heat pump of claim 46 wherein said generator-absorber heat exchange apparatus comprises the apparatus of claim 15.

49. The heat pump of claim 46 wherein said generator-absorber heat exchange apparatus comprises the apparatus of claim 16.

50. The heat pump of claim 46 wherein said generator-absorber heat exchange apparatus comprises the apparatus of claim 21.

51. The heat pump of claim 46 wherein said generator-absorber heat exchange apparatus comprises the apparatus of claim 26.

52. The heat pump of claim 46 wherein said generator-absorber heat exchange apparatus comprises the apparatus of claim 30.

53. The heat pump of claim 46 wherein said generator-absorber heat exchange apparatus comprises the apparatus of claim 31.

54. The heat pump of claim 46 wherein said generator-absorber heat exchange apparatus comprises the apparatus of claim 34.

55. The heat pump of claim 46 wherein said generator-absorber heat exchange apparatus comprises the apparatus of claim 40.

56. A method for transferring heat between an absorber and a generator in a generator-absorber heat exchange apparatus including a generator and an absorber, the absorber having an interior pressure lower than the pressure of the generator interior and each having high and low temperature regions at opposite ends establishing respective temperature ranges and a heat transfer region, the temperature ranges defining the respective heat transfer regions overlapping, and a fluid flow pathway for circulation of a weak liquor from the high temperature region of the generator and a rich liquor from the low temperature region of the absorber to and through the high temperature, heat transfer and low temperature regions of the generator and the absorber, said method comprising:

circulating a portion of at least one of the weak liquor and rich liquor between the heat transfer region of the absorber and the heat transfer region of the generator.

57. The method of claim 56, wherein said portion of a weak liquor and a rich liquor is circulated in a heat exchange conduit having an input end to receive liquor and an output end to distribute liquor, said liquor being circulated between a heat exchange element in the heat transfer region of one of the generator and the absorber and the heat transfer region of the other of the generator and the absorber.

58. The method of claim 57, wherein said portion of a weak liquor and a rich liquor is circulated in a heat exchange conduit between a heat exchange element in the heat transfer region of the absorber and a heat exchange element in the heat transfer region of the generator.

59. The method for transferring heat between an absorber and a generator in accordance with claim 57, wherein said method comprises:

circulating a portion of weak liquor from an input end at the lower end of the generator, through the heat transfer region of the generator and the heat transfer region of the absorber, to an output end proximate the upper end of the absorber, such that the temperature of the weak liquor from the heat transfer region of said absorber is greater than the temperature of the region of the generator to which the weak liquor is circulated, thereby transferring heat to the generator from said portion of the weak liquor.

60. The method of claim 59, wherein said method comprises:

circulating the weak liquor alternately between said heat transfer regions serially via three heat exchange elements disposed in a heat transfer region of the generator and three heat exchange elements disposed in a heat transfer region of the generator, thereby transferring heat via the weak liquor from the heat transfer region of the absorber to the heat transfer region of the generator.

61. The method of claim 59, wherein said method comprises:
circulating the weak liquor alternately between said heat transfer regions serially via four heat exchange elements disposed in a heat transfer region of said generator and four heat exchange elements disposed in a heat transfer region of said generator, thereby transferring heat via the weak liquor from the heat transfer region of the absorber to the heat transfer region of the generator.

62. The method of claim 60, wherein the weak liquor is circulated by a heat exchange circuit pump.

63. The method of claim 60 wherein the weak liquor is circulated by the pressure differential between the absorber and generator.

64. The method of claim 60 wherein the weak liquor circulated between heat transfer regions of the generator and absorber is substantially in the liquid state.

65. The method of claim 59, wherein said method comprises:
circulating the weak liquor between a heat exchange element disposed in a heat transfer region of the generator and a heat exchange element disposed in a heat transfer region of the absorber, thereby transferring heat via the weak liquor from the heat transfer region of the absorber to the heat transfer region of the generator.

66. The method of claim 65, wherein the weak liquor is circulated by a heat exchange circuit pump.

67. The method of claim 65 wherein the weak liquor is circulated by the pressure differential between the absorber and generator in combination with an ejector.

68. The method of claim 65 wherein the weak liquor is circulated by the pressure differential between the absorber and generator in combination with a weak liquor activated pump.

69. The method of claim 65 wherein the weak liquor circulated between heat transfer regions of the generator and absorber is substantially in the liquid state.

70. The method of claim 57, wherein said method comprises:
circulating a mixture of a portion of weak liquor vapor from a first input end at the upper end of the absorber and a portion of weak liquor liquid from a second input end at the lower end of the generator, through the heat transfer region of the generator to an output end in the heat transfer region of the absorber, such that the temperature of the weak liquor vapor and weak liquor liquid mixture from the heat transfer region of the absorber is greater than the temperature of the heat transfer region of the generator, thereby transferring heat to the generator from said portion of the weak liquor vapor and weak liquor liquid mixture.

71. The method of claim 70, wherein said method comprises:
circulating the weak liquor vapor and weak liquor liquid mixture from a heat exchange element disposed in the heat transfer region of the generator to a heat transfer region of the absorber, thereby transferring heat via the weak liquor vapor and weak liquor liquid mixture from the heat transfer region of the absorber to the heat transfer region of the generator.

72. The method of claim 71 wherein the weak liquor vapor and weak liquor liquid mixture is circulated by the pressure differential between the absorber and generator in combination with an ejector.

73. The method of claim 71 wherein the weak liquor vapor and weak liquor liquid mixture circulated between heat transfer regions of the generator and absorber is a two phase mixture of liquid and vapor in at least a portion of the heat exchange circuit.

74. The method of claim 57, wherein said method comprises:
circulating a portion of weak liquor vapor from an input end at the upper end of the absorber, through the heat transfer region of the generator to an output end in the heat transfer region of the absorber, such that the temperature of the weak liquor vapor from the input end at the upper end of the absorber is greater than the temperature of the region of the generator to which the weak liquor vapor condensate is circulated, thereby transferring heat to the generator from said portion of the weak liquor vapor.

75. The method of claim 74, wherein said method comprises:
circulating the weak liquor vapor from the input end at the upper end of the absorber to a heat exchange element in the heat transfer region of the generator, thereby transferring heat via the weak liquor from the absorber to the heat transfer region of the generator.

76. The method of claim 75 wherein the weak liquor is circulated by a heat transfer circuit pump.

77. The method of claim 75 wherein the weak liquor is circulated by the pressure differential between the absorber and generator in combination with an ejector.

78. The method of claim 75 wherein the weak liquor circulated between heat transfer regions of the generator and absorber is a two phase mixture of liquid and vapor in at least a portion of the heat exchange circuit.

79. The method of claim 57, wherein said method comprises:
circulating a portion of rich liquor from an input end in a rich liquor conduit, through the heat transfer region of the generator and the heat transfer region of the absorber, to an output end in the generator, such that the temperature of the rich liquor from the heat transfer region of the absorber is greater than the temperature of the heat transfer region of the generator, thereby transferring heat to the generator from said portion of the rich liquor.

80. The method of claim 79, wherein said method comprises:
circulating the rich liquor from a heat exchange element disposed in the heat transfer region of the absorber to a heat transfer region of the generator, thereby transferring heat via the rich liquor from the heat transfer region of the absorber to the heat transfer region of the generator.

81. The method of claim 80 wherein said rich liquor is circulated to a heat exchange element disposed in a heat transfer region of the generator.

82. The method of claim 81 wherein the rich liquor is circulated by a rich liquor conduit pump.

83. The method of claim 81 wherein the rich liquor is circulated by a heat exchange circuit pump.

84. The method of claim 80 wherein the rich liquor circulated between heat transfer regions of the generator and absorber is a two phase mixture of liquid and vapor in at least a portion of the heat exchange circuit.

85. The method of claim 79, wherein said method comprises:
circulating the rich liquor alternately between said heat transfer regions serially via at least two heat exchange elements disposed in the heat transfer region of the absorber and at least two heat exchange elements in a heat transfer region of the generator, thereby transferring heat via the rich liquor from the heat transfer region of the absorber to the heat transfer region of the generator.

86. The method of claim 85 wherein the rich liquor is circulated by a rich liquor conduit pump.

87. The method of claim 85 wherein the rich liquor circulated between heat transfer regions of the generator and absorber is substantially in the liquid state.

88. A method of transferring heat between a region of low temperature and a region of medium temperature using a generator-absorber heat exchange apparatus including a generator and an absorber, the absorber having an interior pressure lower than the pressure of the generator interior and each having high and low temperature regions at opposite ends establishing respective temperature ranges and a heat transfer region, the temperature ranges defining the respective heat transfer regions overlapping, and a fluid flow pathway for circulation of a weak liquor from the high temperature region of the generator and a rich liquor from the low temperature region of the absorber to and through the high temperature, heat transfer and low temperature regions of the generator and the absorber, said method comprising:
circulating at least a portion of antifreeze fluid between an indoor heat exchanger and at least one of an absorber heat exchanger, a condenser heat exchanger and a generator heat exchanger, thereby transferring heat via said antifreeze fluid from said at least one absorber, condenser and generator heat exchanger to said indoor heat exchanger;
circulating an antifreeze fluid between an outdoor heat exchanger and an evaporator heat exchanger, thereby transferring heat via said antifreeze fluid from said outdoor heat exchanger to said evaporator heat exchanger; and
wherein said generator-absorber heat exchange apparatus includes a heat exchange circuit disposed to receive a portion of the liquor from the fluid flow pathway and to circulate said portion of the liquor between said heat transfer regions to transfer heat from the absorber to the generator.

89. A method of transferring heat between a region of medium temperature and a region of high temperature using a generator-absorber heat exchange apparatus including a generator and an absorber, the absorber having an interior pressure lower than the pressure of the generator interior and each having high and low temperature regions at opposite ends establishing respective temperature ranges and a heat transfer region, the temperature ranges defining the respective heat transfer regions overlapping, and a fluid flow pathway for circulation of a weak liquor from the high temperature region of the generator and a rich liquor from the low temperature region of the absorber to and through the high temperature, heat transfer and low temperature regions of the generator and the absorber, said method comprising:
circulating at least a portion of antifreeze fluid between an outdoor heat exchanger and at least one of an absorber heat exchanger, a condenser heat exchanger and a generator heat exchanger, thereby transferring heat via said antifreeze fluid from said at least one absorber, condenser and generator heat exchanger to said outdoor heat exchanger;
circulating an antifreeze fluid between an indoor heat exchanger and an evaporator heat exchanger, thereby transferring heat via said antifreeze fluid from said indoor heat exchanger to said evaporator heat exchanger; and
wherein said generator-absorber heat exchange apparatus includes a heat exchange circuit disposed to receive a portion of the liquor from the fluid flow pathway and to circulate said portion of the liquor between said heat transfer regions to transfer heat from the absorber to the generator.

* * * * *

UNITED STATES PATENT AND TRADEMARK OFFICE
CERTIFICATE OF CORRECTION

PATENT NO. : B1 5,367,884

DATED : 12/31/96

INVENTOR(S) : PHILLIPS et al.

It is certified that error appears in the above-identified patent and that said Letters Patent is hereby corrected as shown below:

```
     Claim 46, col 6, line 5, before "ranges", insert
--regions at opposite ends establishing respective
temperature--;

line 20, after "therein;", insert
--and--.
```

Signed and Sealed this

Fifteenth Day of April, 1997

Attest:

BRUCE LEHMAN

Attesting Officer

Commissioner of Patents and Trademarks

REEXAMINATION CERTIFICATE (3090th)

United States Patent [19]
Phillips et al.

[11] B1 5,367,884
[45] Certificate Issued Dec. 31, 1996

[54] GENERATOR-ABSORBER-HEAT EXCHANGE HEAT TRANSFER APPARATUS AND METHOD AND USE THEREOF IN A HEAT PUMP

[75] Inventors: Benjamin A. Phillips, Benton Harbor; Thomas S. Zawacki, St. Joseph, both of Mich.; Joseph Marsala, Glen Ellyn, Ill.

[73] Assignee: Phillips Engineering Co., St. Joseph, Mich.

Reexamination Request:
No. 90/003,736, Feb. 22, 1995

Reexamination Certificate for:
Patent No.: 5,367,884
Issued: Nov. 29, 1994
Appl. No.: 076,759
Filed: Jun. 15, 1993

Related U.S. Application Data

[63] Continuation-in-part of Ser. No. 793,644, Nov. 18, 1991, Pat. No. 5,271,235, which is a continuation-in-part of Ser. No. 668,198, Mar. 12, 1991, abandoned.

[51] Int. Cl.$^6$ .................................................. F25B 15/00
[52] U.S. Cl. .................. 62/101; 62/476; 62/238.3; 62/497; 62/485
[58] Field of Search ................ 62/476, 483, 101, 62/107, 109, 111

[56] References Cited

U.S. PATENT DOCUMENTS

| | | |
|---|---|---|
| 2,392,894 | 1/1946 | Zwickl. |
| 4,311,019 | 1/1982 | Rojey et al. ................. 62/101 |
| 4,718,237 | 1/1988 | Sterlini. |
| 4,972,679 | 11/1990 | Petty et al.. |
| 5,218,843 | 6/1993 | Dao. |
| 5,271,235 | 12/1993 | Phillips et al.. |
| 5,490,393 | 2/1996 | Fuesting et al.. |

FOREIGN PATENT DOCUMENTS

| | | |
|---|---|---|
| 272868 | 1/1928 | United Kingdom. |
| 2179137 | 2/1987 | United Kingdom. |

OTHER PUBLICATIONS

R. J. Modahl and F. C. Hayes, Evaluation of a Commercial Advanced Absorption Heat Pump Breadboard, published in 1988, pp. 117–125.

Development of a Residential Gas Fired Absorption Heat Pump, Chemical Sector Allied Corp., published in Aug. 1985.

Phillips Engineering Gas Space Conditioner, published on Nov. 5, 1990.

*Primary Examiner*—John Sollecito

[57] ABSTRACT

Numerous embodiments and related methods for generator-absorber heat exchange (GAX) are disclosed, particularly for absorption heat pump systems. Such embodiments and related methods use the working solution of the absorption system for the heat transfer medium.

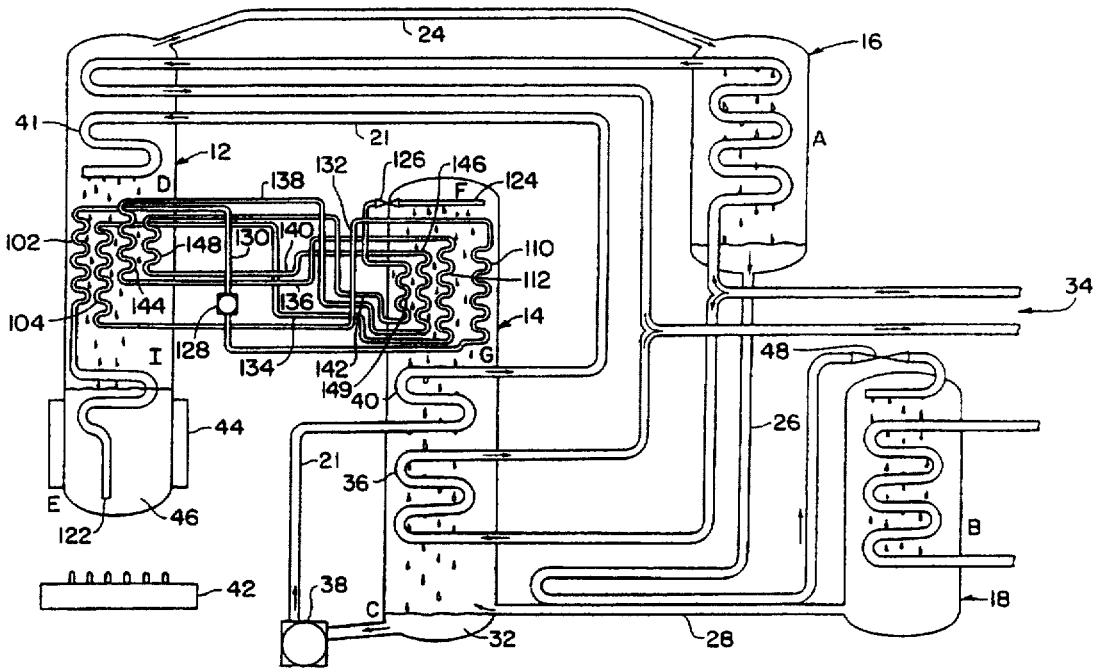

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 10–12 are cancelled.

Claims 1, 15, 16, 21, 26, 30, 41, 46, 55–59, 70, 74, 79, 88 and 89 are determined to be patentable as amended.

Claims 2–9, 13–14, 17–20, 22–25, 27–29, 31–40, 42–45, 47–54, 60–69, 71–73, 75–78 and 80–87, dependent on an amended claim, are determined to be patentable.

New claims 90–93 are added and determined to be patentable.

1. [In a] *A* generator-absorber heat exchange apparatus [including] *comprising:* a generator and an absorber, the absorber having an interior pressure lower than the pressure of the generator interior *and having an absorber heat exchange region,* and each having high and low temperature regions at opposite ends establishing respective temperature ranges and a heat transfer region, the temperature ranges defining the respective heat transfer regions overlapping, and a fluid flow pathway circulating a weak liquor from the high temperature region of the generator and a rich liquor from the low temperature region of the absorber to and through the high temperature, heat transfer and low temperature regions of the generator and the absorber, [the improvement comprising:] *with the rich liquor being circulated from the low temperature region of the absorber through the absorber heat exchange region of the absorber;* and a heat exchange circuit receiving a portion of the liquor from the fluid flow pathway and circulating said portion of the liquor between said heat transfer regions transferring heat from the absorber to the generator.

15. A generator-absorber heat exchange apparatus comprising:

a generator containing a liquor having a concentration gradient extending from rich proximate an upper end to weak proximate a lower end and a temperature gradient extending from low proximate the upper end to high proximate the lower end;

an absorber having a pressure in its interior lower than the interior pressure of the generator, *having an absorber heat exchange region,* and containing a liquor having a concentration gradient extending from weak proximate an upper end to rich proximate a lower end and a temperature gradient extending from high proximate the upper end to low proximate the lower end;

a rich liquor conduit having an inlet in fluid communication with the absorber proximate the lower end thereof and an outlet disposed in the generator proximate the upper end thereof distributing rich liquor from the lower end of the absorber *through the absorber heat exchange region of the absorber to the generator* for passage along the concentration and temperature gradients of the generator;

a pump in fluid communication with the rich liquor conduit moving fluid through the conduit from the absorber to the generator;

a weak liquor conduit having an inlet in fluid communication with the generator proximate the lower end thereof and an outlet disposed in the absorber proximate the upper end thereof distributing weak liquor from the lower end of the generator for passage along the concentration and temperature gradients of the absorber;

a heater disposed to heat liquor in the generator proximate the lower end thereof; and a heat exchange circuit comprising:

at least one heat exchange element disposed in one of the absorber and generator in a heat transfer region thereof, said heat transfer regions of the generator and absorber having overlapping temperatures;

a heat exchange conduit having an input end receiving liquor from at least one of the absorber, the generator, the rich liquor conduit and the weak liquor conduit and an output end disposed distributing the liquor in one of the absorber and generator, the conduit conveying the liquor between the heat transfer regions of the absorber and the generator thereby transfering heat therein.

16. [The apparatus of claim 15 wherein said heat exchange circuit comprises] *A generator-absorber heat exchange apparatus comprising:*

*a generator containing a liquor having a concentration gradient extending from rich proximate an upper end to weak proximate a lower end and a temperature gradient extending from low proximate the upper end to high proximate the lower end;*

*an absorber having a pressure in its interior lower than the interior pressure of the generator and containing a liquor having a concentration gradient extending from weak proximate an upper end to rich proximate a lower end and a temperature gradient extending from high proximate the upper end to low proximate the lower end;*

*a rich liquor conduit having an inlet in fluid communication with the absorber proximate the lower end thereof and an outlet disposed in the generator proximate the upper end thereof distributing rich liquor from the lower end of the absorber for passage along the concentration and temperature gradients of the generator;*

*a pump in fluid communication with the rich liquor conduit moving fluid through the conduit from the absorber to the generator;*

*a weak liquor conduit having an inlet in fluid communication with the generator proximate the lower end thereof and an outlet disposed in the absorber proximate the upper end thereof distributing weak liquor from the lower end of the generator for passage along the concentration and temperature gradients of the absorber;*

*a heater disposed to heat liquor in the generator proximate the lower end thereof; and*

*a heat exchange circuit comprising:*

*at least three heat exchange elements disposed in the heat transfer region of the generator and at least three* heat exchange elements disposed in the heat transfer region of the absorber, *said heat transfer regions of the generator and absorber having overlapping temperatures; and* a heat exchange conduit having said input end disposed to receive weak liquor from the lower end of the generator and said output end disposed to distribute said weak liquor to the upper end of the absorber, said heat exchange conduit serially interconnecting said heat exchangers to conduct said weak liquor alternately between the generator and absorber heat transfer regions.

21. [The apparatus of claim 15 wherein said heat exchange circuit comprises] *A generator-absorber heat exchange apparatus comprising:*

*a generator containing a liquor having a concentration gradient extending from rich proximate an upper end to weak proximate a lower end and a temperature gradient extending from low proximate the upper end to high proximate the lower end;*

*an absorber having a pressure in its interior lower than the interior pressure of the generator and containing a liquor having a concentration gradient extending from weak proximate an upper end to rich proximate a lower end and a temperature gradient extending from high proximate the upper end to low proximate the lower end;*

*a rich liquor conduit having an inlet fluid communication with the absorber proximate the lower end thereof and an outlet disposed in the generator proximate the upper end thereof distributing rich liquor from the lower end of the absorber for passage along the concentration and temperature gradients of the generator;*

*a pump in fluid communication with the rich liquor conduit moving fluid through the conduit from the absorber to the generator;*

*a weak liquor conduit having an inlet in fluid communication with the generator proximate the lower end thereof and an outlet disposed in the absorber proximate the upper end thereof distributing weak liquor from the lower end of the generator for passage along the concentration and temperature gradients of the absorber;*

*a heater disposed to heat liquor in the generator proximate the lower end thereof; and*

*a heat exchange circuit comprising:* a heat exchange element disposed in the heat transfer region of the generator and a heat exchange element disposed in the heat transfer region of the absorber, *said heat transfer regions of the generator and absorber having overlapping temperatures; and* a heat exchange conduit having said input end disposed to receive weak liquor from the lower end of the generator and said output end disposed to distribute said weak liquor to the upper end of the absorber, said heat exchange conduit serially interconnecting said heat exchange elements to conduct said weak liquor alternately between the generator and absorber heat transfer regions.

26. [The apparatus of claim 15 wherein said heat exchange circuit comprises] *A generator-absorber heat exchange apparatus comprising:*

*a generator containing a liquor having a concentration gradient extending from rich proximate an upper end to weak proximate a lower end and a temperature gradient extending from low proximate the upper end to high proximate the lower end;*

*an absorber having a pressure in its interior lower than the interior pressure of the generator and containing a liquor having a concentration gradient extending from weak proximate an upper end to rich proximate a lower end and a temperature gradient extending from high proximate the upper end to low proximate the lower end;*

*a rich liquor conduit having an inlet in fluid communication with the absorber proximate the lower end thereof and an outlet disposed in the generator proximate the upper end thereof distributing rich liquor from the lower end of the absorber for passage along the concentration and temperature gradients of the generator;*

*a pump in fluid communication with the rich liquor conduit moving fluid through the conduit from the absorber to the generator;*

*a weak liquor conduit having an inlet in fluid communication with the generator proximate the lower end thereof and an outlet disposed in the absorber proximate the upper end thereof distributing weak liquor from the lower end of the generator for passage along the concentration and temperature gradients of the absorber;*

*a heater disposed to heat liquor in the generator proximate the lower end thereof; and*

*a heat exchange circuit comprising:* a heat exchange element disposed in the heat transfer region of the generator; *and* a heat exchange circuit having a first input end disposed to receive weak liquor vapor from the upper end of the absorber and a second input end disposed to receive weak liquor from the lower end of the generator, and having said output end disposed to distribute a mixture of said weak liquor vapor and weak liquor in the [generator] *absorber.*

30. [The apparatus of claim 15 wherein said heat exchange circuit comprises] *A generator-absorber heat exchange apparatus comprising:*

*a generator containing a liquor having a concentration gradient extending from rich proximate an upper end to weak proximate a lower end and a temperature gradient extending from low proximate the upper end to high proximate the lower end;*

*an absorber having a pressure in its interior lower than the interior pressure of the generator and containing a liquor having a concentration gradient extending from weak proximate an upper end to rich proximate a lower end and a temperature gradient extending from high proximate the upper end to low proximate the lower end;*

*a rich liquor conduit having an inlet in fluid communication with the absorber proximate the lower end thereof and an outlet disposed in the generator proximate the upper end thereof distributing rich liquor from the lower end of the absorber for passage along the concentration and temperature gradients of the generator;*

*a pump in fluid communication with the rich liquor conduit moving fluid through the conduit from the absorber to the generator;*

*a weak liquor conduit having an inlet in fluid communication with the generator proximate the lower end thereof and an outlet disposed in the absorber proximate the upper end thereof distributing weak liquor* from the lower end of the generator for passage along the concentration and temperature gradients of the absorber;

a heater disposed to heat liquor in the generator proximate the lower end thereof; and a heat exchange circuit comprising:
   a heat exchange element disposed in the heat transfer region of the generator; *and*
   a heat exchange conduit having said input end disposed to receive weak liquor vapor from the upper end of the absorber and said output end disposed to distribute the condensate of said weak liquor vapor in the absorber.

41. [The apparatus of claim 15 wherein said heat exchange circuit comprises] *A generator-absorber heat exchange apparatus comprising:*

*a generator containing a liquor having a concentration gradient extending from rich proximate an upper end to weak proximate a lower end and a temperature gradient extending from low proximate the upper end to high proximate the lower end;*

*an absorber having a pressure in its interior lower than the interior pressure of the generator and containing a liquor having a concentration gradient extending from weak proximate an upper end to rich proximate a lower end and a temperature gradient extending from high proximate the upper end to low proximate the lower end;*

*a rich liquor conduit having an inlet in fluid communication with the absorber proximate the lower end thereof and an outlet disposed in the generator proximate the upper end thereof distributing rich liquor from the lower end of the absorber for passage along the concentration and temperature gradients of the generator;*

*a pump in fluid communication with the rich liquor conduit moving fluid through the conduit from the absorber to the generator;*

*a weak liquor conduit having an inlet in fluid communication with the generator proximate the lower end thereof and an outlet disposed in the absorber proximate the upper end thereof distributing weak liquor from the lower end of the generator for passage along the concentration and temperature gradients of the absorber;*

*a heater disposed to heat liquor in the generator proximate the lower end thereof; and*

*a heat exchange circuit comprising:* at least two heat exchange elements disposed in the heat transfer region of the absorber and at least two heat exchange elements disposed in the heat transfer region of the generator, said heat transfer regions of the generator and absorber having overlapping temperature; and a heat exchange conduit having said input end disposed to receive rich liquor from the rich liquor conduit and said output end disposed to distribute said rich liquor in the generator, said heat exchange conduit serially interconnecting said heat exchange elements to conduct said rich liquor alternately between the generator and absorber heat transfer regions.

46. A heat pump comprising:
an indoor liquid-air heat exchanger;
an outdoor liquid -air heat exchanger;
a generator-absorber heat exchange apparatus comprising:

a generator and an absorber, the absorber having an interior pressure lower than the interior pressure of the generator *and having an absorber heat exchange region,* and each having high and low temperature ranges and a heat transfer region, the temperature ranges defining respective heat transfer regions overlapping;

a fluid flow pathway circulating a weak liquor from the high temperature region of the generator and a rich liquor from the low temperature region of the absorber to and through the high temperature, heat transfer and low temperature regions of the generator and the absorber, *with the rich liquor being circulated from the low temperature region of the absorber through the absorber heat exchange region of the absorber;* a heat exchange circuit receiving a portion of the liquor from the fluid flow pathway and circulating the portion of the liquor between the heat transfer regions of the generator and the absorber thereby transferring heat therein;

an antifreeze circuit circulating antifreeze fluid between each of the indoor and outdoor heat exchangers and the generator-absorber heat exchange apparatus selectively extracting heat from one of said heat exchangers and transferring heat to the other of said heat exchangers.

55. The heat pump of claim 46 wherein said generator-absorber heat exchange apparatus comprises the apparatus of claim [40] *41.*

56. A method for transferring heat between an absorber and a generator in a generator-absorber heat exchange apparatus including a generator and an absorber, the absorber having an interior pressure lower than the pressure of the generator interior *and having an absorber heat exchange region,* and each having high and low temperature regions at opposite ends establishing respective temperature ranges and a heat transfer region, the temperature ranges defining the respective heat transfer regions overlapping, and a fluid flow pathway for circulation of a weak liquor from the high temperature region of the generator and a rich liquor from the low temperature region of the absorber to and through the high temperature, heat transfer and low temperature regions of the generator and the absorber, *with the rich liquor being circulated from the low temperature region of the absorber through the absorber heat exchange region of the absorber,* said method comprising:

circulating a portion of [at least one of] the weak liquor [and] *or* rich liquor *from the fluid flow pathway* between the heat transfer region of the absorber and the heat transfer region of the generator.

57. The method of claim 56, wherein said [portion of a weak liquor and a rich liquor] *liquor from the fluid flow pathway* is circulated in a heat exchange conduit having an input end to receive liquor and an output end to distribute liquor, said liquor being circulated between a heat exchange element in the heat transfer region of one of the generator and the absorber and the heat transfer region of the other of the generator and the absorber.

58. The method of claim 57, wherein said [portion of a weak liquor and a rich liquor] *liquor from the fluid flow pathway* is circulated in a heat exchange conduit between a heat exchange element in the heat transfer region of the absorber and a heat exchange element in the heat transfer region of the generator.

59. [The] *A* method for transferring heat between an absorber and a generator [in accordance with claim 57, wherein said method comprises] *in a generator-absorber heat exchange apparatus including a generator and an* absorber, the absorber having an interior pressure lower than the pressure of the generator interior and each having high and low temperature regions at opposite ends establishing respective temperature ranges and a heat transfer region, the temperature ranges defining the respective heat transfer regions overlapping, and a fluid flow pathway for circulating of a weak liquor from the high temperature region of the generator and a rich liquor from the low temperature region of the absorber to and through the high temperature, heat transfer and low temperature regions of the generator and the absorber, said method comprising:

circulating a portion of weak liquor from an input end at the lower end of the generator, through the heat transfer region of the generator and the heat transfer region of the absorber, to an output end proximate the upper end of the absorber, such that the temperature of the weak liquor from the heat transfer region of said absorber is greater than the temperature of the region of the generator to which the weak liquor is circulated, thereby transferring heat to the generator from said portion of the weak liquor.

70. [The method of claim 57, wherein said method comprises] *A method for transferring heat between an absorber and a generator in a generator-absorber heat exchange apparatus including a generator and an absorber, the absorber having an interior pressure lower than the pressure of the generator interior and each having high and low temperature regions at opposite ends establishing respective temperature ranges and a heat transfer region, the temperature ranges defining the respective heat transfer regions overlapping, and a fluid flow pathway for circulation of a weak liquor from the high temperature region of the generator and a rich liquor from the low temperature region of the absorber to and through the high temperature, heat transfer and low temperature regions of the generator and the absorber, said method comprising:* circulating a mixture of a portion of weak liquor vapor from a first input end at the upper end of the absorber and a portion of weak liquor liquid from a second input end at the lower end of the generator, through the heat transfer region of the generator to an output end in the heat transfer region of the absorber, such that the temperature of the weak liquor vapor and weak liquor liquid mixture from the heat transfer region of the absorber is greater than the temperature of the heat transfer region of the generator, thereby transferring heat to the generator from said portion of the weak liquor vapor and weak liquor liquid mixture.

74. [The method of claim 57, wherein said method comprises] *A method for transferring heat between an absorber and a generator in a generator-absorber heat exchange apparatus including a generator and an absorber, the absorber having an interior pressure lower than the pressure of the generator interior and each having high and low temperature regions at opposite ends establishing respective temperature ranges and a heat transfer region, the temperature ranges defining the respective heat transfer regions overlapping, and a fluid flow pathway for circulation of a weak liquor from the high temperature region of the generator and a rich liquor from the low temperature region of the absorber to and through the high temperature, heat transfer and low temperature regions of the generator and the absorber, said method comprising:* circulating a portion of weak liquor vapor from an input end at the upper end of the absorber, through the heat transfer region of the generator to an output end in the heat transfer region of the absorber, such that the temperature of the weak liquor vapor from the input end at the upper end of the absorber is greater than the temperature of the region of the generator to which the weak liquor vapor condensate is circulated, thereby transferring heat to the generator from said portion of the weak liquor vapor.

79. [The method of claim 57, wherein said method comprises] *A method for transferring heat between an absorber and a generator in a generator-absorber heat exchange apparatus including a generator and an absorber, the absorber having an interior pressure lower than the pressure of the generator interior and each having high and low temperature regions at opposite ends establishing respective temperature ranges and a heat transfer region, the temperature ranges defining the respective heat transfer regions overlapping, and a fluid flow pathway for circulation of a weak liquor from the high temperature region of the generator and a rich liquor from the low temperature region of the absorber to and through the high temperature, heat transfer and low temperature regions of the generator and the absorber, said method comprising:* circulating a portion of rich liquor from an input end in a rich liquor conduit, through the heat transfer region of the generator and the heat transfer region of the absorber, to an output end in the generator, such that the temperature of the rich liquor from the heat transfer region of the absorber is greater than the temperature of the heat transfer region of the generator, thereby transferring heat to the generator from said portion of the rich liquor.

88. A method of transferring heat between a region of low temperature and a region of medium temperature using a generator-absorber heat exchange apparatus including a generator and an absorber, the absorber having an interior pressure lower than the pressure of the generator interior *and having an absorber heat exchange region,* and each having high and low temperature regions at opposite ends establishing respective temperature ranges and a heat transfer region, the temperature ranges defining the respective heat transfer regions overlapping, and a fluid flow pathway for circulation of a weak liquor from the high temperature region of the generator and a rich liquor from the low temperature region of the absorber to and through the high temperature, heat transfer and low temperature regions of the generator and the absorber, *with the rich liquor being circulated from the low temperature region of the absorber through the absorber heat exchange region of the absorber,* said method comprising:

circulating at least a portion of antifreeze fluid between an indoor heat exchanger and at least one of an absorber heat exchanger, a condenser heat exchanger and a generator heat exchanger, thereby transferring heat via said antifreeze fluid from said at least one absorber, condenser and generator heat exchanger to said indoor heat exchanger;

circulating an antifreeze fluid between an outdoor heat exchanger and an evaporator heat exchanger, thereby transferring heat via said antifreeze fluid from said outdoor heat exchanger to said evaporator heat exchanger; and wherein said generator-absorber heat exchange apparatus includes a heat exchange circuit disposed to receive a portion of the liquor from the fluid flow pathway and to circulate said portion of the liquor between said heat transfer regions *of the generator and absorber* to transfer heat from the absorber to the generator.

89. A method of transferring heat between a region of low temperature and a region of medium temperature using a generator-absorber heat exchange apparatus including a generator and an absorber, the absorber having an interior pressure lower than the pressure of the generator interior *and having an absorber heat exchange region,* and each having high and low temperature regions at opposite ends establishing respective temperature ranges and a heat transfer region, the temperature ranges defining the respective heat transfer regions overlapping, and a fluid flow pathway for circulation of a weak liquor from the high temperature region of the generator and a rich liquor from the low temperature region of the absorber to and through the high temperature, heat transfer and low temperature regions of the generator and the absorber, *with the rich liquor being circulated from the low temperature region of the absorber through the absorber heat exchange region of the absorber,* said method comprising:

circulating at least a portion of antifreeze fluid between an indoor heat exchanger and at least one of an absorber heat exchanger, a condenser heat exchanger and a generator heat exchanger, thereby transferring heat via said antifreeze fluid from said at least one absorber, condenser and generator heat exchanger to said indoor heat exchanger;

circulating an antifreeze fluid between an outdoor heat exchanger and an evaporator heat exchanger, thereby transferring heat via said antifreeze fluid from said outdoor heat exchanger to said evaporator heat exchanger; and wherein said generator-absorber heat exchange apparatus includes a heat exchange circuit disposed to receive a portion of the liquor from the fluid flow pathway and to circulate said portion of the liquor between said heat transfer regions *of the generator and absorber* to transfer heat from the absorber to the generator.

*90. In a generator-absorber heat exchange apparatus including a generator and an absorber, the absorber having an interior pressure lower than the pressure of the generator interior and each having high and low temperature regions at opposite ends establishing respective temperature ranges and a heat transfer region, the temperature ranges defining the respective heat transfer regions overlapping, and a fluid flow pathway circulating a weak liquor from the high temperature region of the generator and a rich liquor from the low temperature region of the absorber to and through the high temperature, heat transfer and low temperature regions of the generator and the absorber, the improvement comprising:*

*a heat exchange circuit receiving a portion of the liquor from the fluid flow pathway and circulating said portion of the liquor between said heat transfer regions transfering heat from the absorber to the generator;*

*wherein the heat exchange circuit comprises an input end in fluid communication with the fluid flow pathway and an output end for distributing said portion of the liquor within one of the generator and the absorber, said input end being in fluid communication with the fluid flow pathway at a location where the liquor is a weak liquor.*

*91. The apparatus of claim 90, wherein the input end is in fluid communication with the fluid flow pathway at a location where the liquor is a weak liquor vapor.*

*92. The apparatus of claim 90, wherein a first input end is in fluid communication with the fluid flow pathway at a location where the liquor is a weak liquor vapor and a second input end is in fluid communication with the fluid flow pathway at a location where the liquor is a weak liquor liquid.*

*93. The apparatus of claim 90, wherein the input end is in fluid communication with the fluid flow pathway at a location where the liquor is a weak liquor liquid.*

\* \* \* \* \*